(12) United States Patent
Molho et al.

(10) Patent No.: US 11,237,131 B2
(45) Date of Patent: Feb. 1, 2022

(54) SYSTEMS AND METHODS FOR ELECTROPHORETIC SEPARATION AND ANALYSIS OF ANALYTES

(71) Applicant: ProteinSimple, Santa Clara, CA (US)

(72) Inventors: Joshua I. Molho, Oakland, CA (US); Kelly Gardner, Berkeley, CA (US); Danh C. Tran, Hayward, CA (US); Eric Jabart, Berkeley, CA (US); David Nilson, Walnut Creek, CA (US); Yuri Kouchnir, Sunnyvale, CA (US); Michael Huston, San Jose, CA (US); Colin B. Kennedy, Greenbrae, CA (US); David John Roach, Los Gatos, CA (US)

(73) Assignee: ProteinSimple, Santa Clara, CA (US)

( * ) Notice: Subject to any disclaimer, the term of this patent is extended or adjusted under 35 U.S.C. 154(b) by 542 days.

(21) Appl. No.: 15/160,636

(22) Filed: May 20, 2016

(65) Prior Publication Data
US 2016/0370319 A1    Dec. 22, 2016

Related U.S. Application Data

(60) Provisional application No. 62/164,495, filed on May 20, 2015.

(51) Int. Cl.
G01N 27/447 (2006.01)

(52) U.S. Cl.
CPC . *G01N 27/44782* (2013.01); *G01N 27/44704* (2013.01); *G01N 27/44726* (2013.01);
(Continued)

(58) Field of Classification Search
CPC ... G01N 27/477–453; G01N 27/44782; G01N 27/44739; G01N 27/44752; G01N 27/44756
See application file for complete search history.

(56) References Cited

U.S. PATENT DOCUMENTS 3,951,776 A * 4/1976 Eibl ................. G01N 27/44756
422/82.01
4,622,124 A * 11/1986 Kreisher .......... G01N 27/44739
204/614
(Continued)

FOREIGN PATENT DOCUMENTS

CN     101535800 A    9/2009
EP      0169397 B1    10/1991
(Continued)

OTHER PUBLICATIONS

International Search Report and Written Opinion for International Application No. PCT/US2016/033524, dated Dec. 15, 2016, 18 pages.
(Continued)

*Primary Examiner* — Joshua L Allen
(74) *Attorney, Agent, or Firm* — Cooley LLP

(57) ABSTRACT

A system for assaying a biological sample for a presence of a target analyte includes an assaying device and a computer controller. The assaying device includes a housing, a receptacle disposed in the housing, and a source of activation energy. The receptacle is configured to accept an electrophoresis cell. The electrophoresis cell has a recess area configured to accept a chip configured to accept the biological sample. The chip includes a polymeric separation medium with activatable functional groups that covalently bond to the target analyte when activated. The source of activation energy is configured to supply activation energy to activate the activatable functional groups. The computer controller is operably coupled to the source of activation energy and is configured to activate the source of activation energy to direct an application of activation energy to the polymeric separation medium to activate the activatable functional groups.

46 Claims, 17 Drawing Sheets

(52) U.S. Cl.
CPC . *G01N 27/44739* (2013.01); *G01N 27/44752* (2013.01); *G01N 27/44756* (2013.01)

(56) References Cited

U.S. PATENT DOCUMENTS

| | | | | |
|---|---|---|---|---|
| 4,911,816 | A * | 3/1990 | Love | B01D 57/02 204/614 |
| 5,779,869 | A * | 7/1998 | Helfer | G01N 27/44704 204/456 |
| 6,379,516 | B1 * | 4/2002 | Cabilly | B01D 57/02 204/450 |
| 8,241,477 | B2 * | 8/2012 | Ben-Asouli | G01N 27/44704 204/450 |
| 8,562,802 | B1 | 10/2013 | Beaudet et al. | |
| 2003/0168339 | A1 | 9/2003 | Audeh | |
| 2004/0050699 | A1 | 3/2004 | Goncalves | |
| 2005/0121325 | A1 * | 6/2005 | Updyke | G01N 27/44747 204/469 |
| 2006/0199259 | A1 | 9/2006 | Cerrone et al. | |
| 2006/0207882 | A1 * | 9/2006 | Ben-Asouli | C07K 1/26 204/469 |
| 2006/0292649 | A1 | 12/2006 | Cahill et al. | |
| 2007/0033587 | A1 | 2/2007 | Siebrecht | |
| 2008/0009078 | A1 | 1/2008 | O'Neill et al. | |
| 2008/0110758 | A1 | 5/2008 | Weber | |
| 2010/0075858 | A1 | 3/2010 | Davis et al. | |
| 2012/0168737 | A1 | 7/2012 | Tomono et al. | |
| 2012/0315189 | A1 | 12/2012 | Scott et al. | |
| 2013/0213810 | A1 | 8/2013 | Tan et al. | |
| 2014/0167924 | A1 | 6/2014 | Morris et al. | |
| 2015/0090591 | A1 | 4/2015 | Yang et al. | |
| 2015/0346146 | A1 * | 12/2015 | Hatakeyama | G01N 27/44704 204/612 |
| 2016/0187293 | A1 * | 6/2016 | Zenhausern | G01N 27/44756 204/450 |
| 2017/0242020 | A1 * | 8/2017 | Yamauchi | C07K 1/26 |

FOREIGN PATENT DOCUMENTS

| | | |
|---|---|---|
| JP | 2005-538381 | 12/2005 |
| JP | 2014-513796 | 6/2014 |
| JP | 5767401 | 8/2015 |
| WO | WO 2000/041733 | 7/2000 |
| WO | WO 2002/033392 | 4/2002 |
| WO | WO 2002/037904 | 5/2002 |
| WO | WO 2004/025252 | 3/2004 |
| WO | WO 2006/082575 | 8/2006 |
| WO | WO 2008/025806 | 3/2008 |
| WO | WO 2008/124064 | 10/2008 |
| WO | WO 2012/154905 | 11/2012 |
| WO | WO 2012/168737 | 12/2012 |
| WO | WO 2014/138475 | 9/2014 |
| WO | WO-2014178107 A1 | 11/2014 |
| WO | WO 2016/187535 | 11/2016 |

OTHER PUBLICATIONS

Extended European Search Report for European Application No. 16797377.5, dated Feb. 21, 2019, 10 pages.
First Office Action for Chinese Application No. 201680028953.6, dated Dec. 30, 2019, 25 pages.
Notice of Reasons for Rejection for Japanese Application No. 2017-558412, dated Feb. 19, 2020, 13 pages.
Second Office Action for Chinese Application No. 201680028953.6, dated Jul. 20, 2020, 22 pages.
Notice of Reasons for Rejection for Japanese Application No. 2017-558412, dated Sep. 8, 2020, 7 pages.
Extended European Search Report for European Application No. 20187850.1, dated Nov. 25, 2020, 6 pages.

* cited by examiner

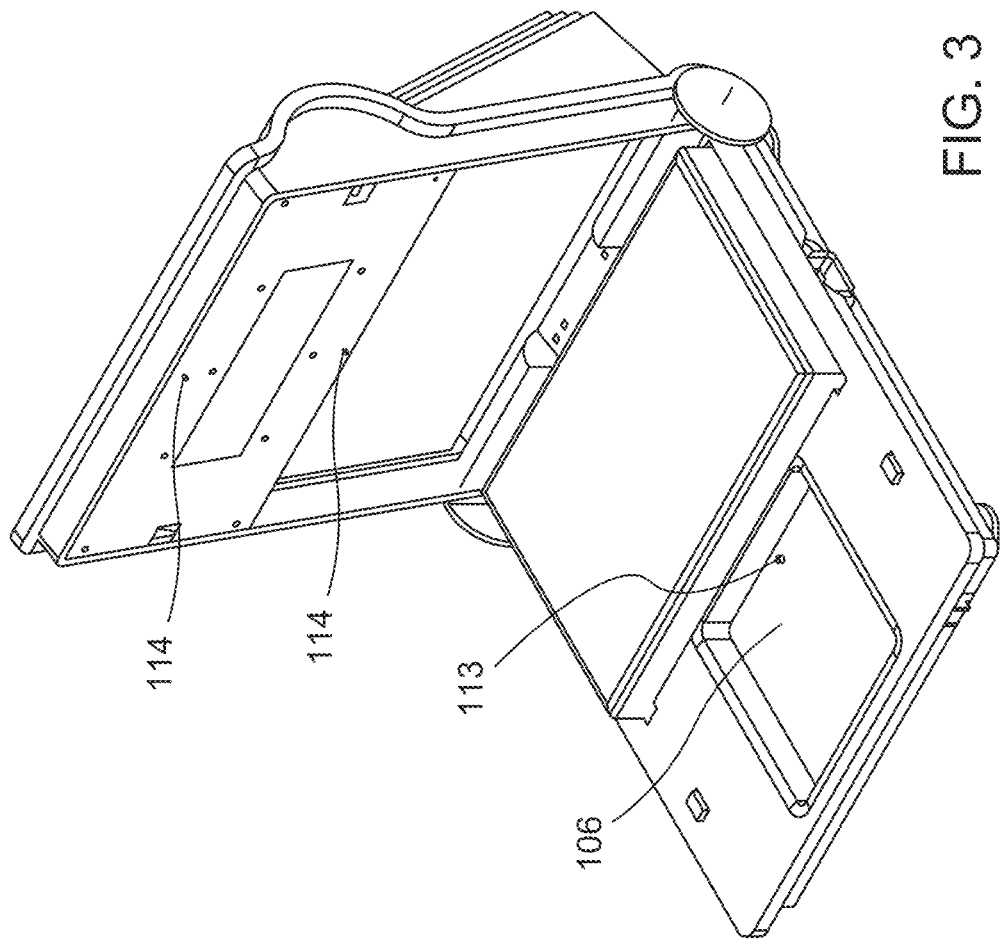
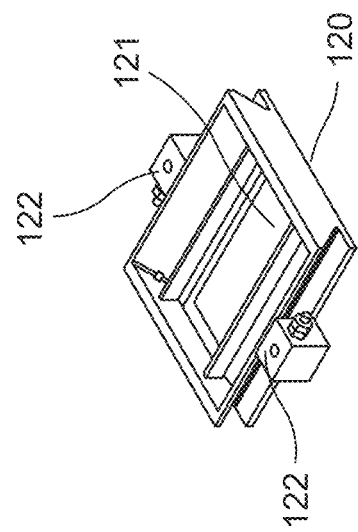
FIG. 3

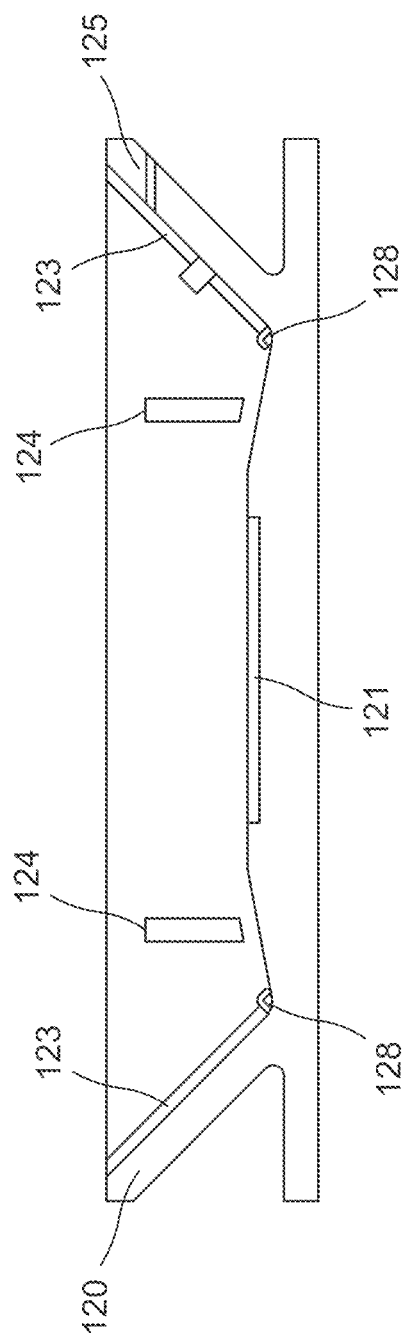
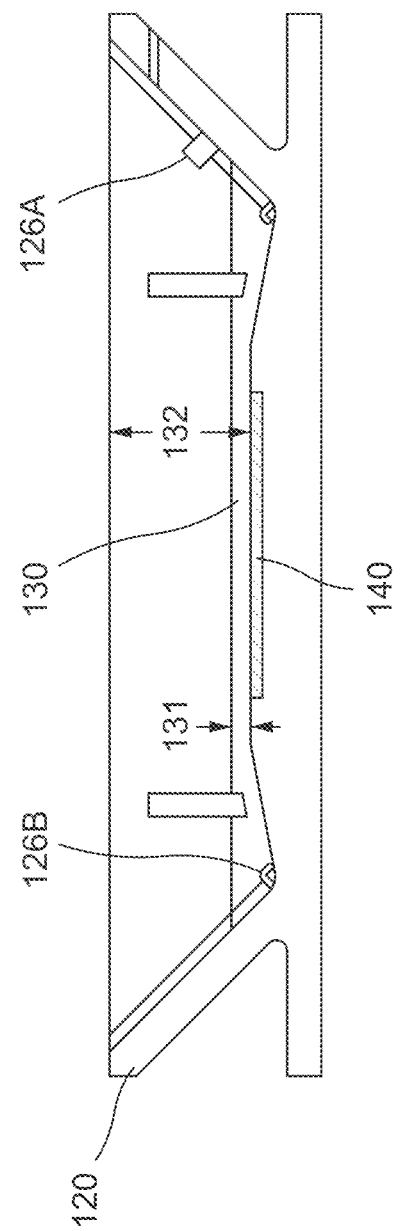

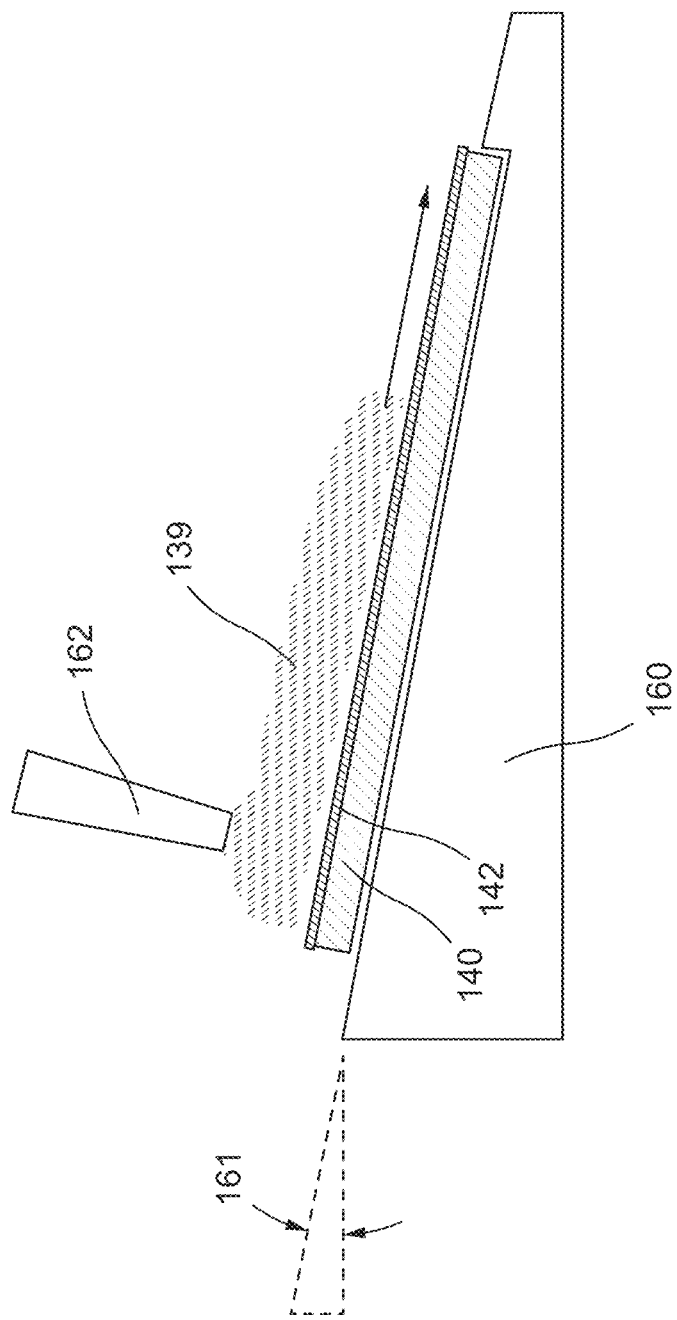

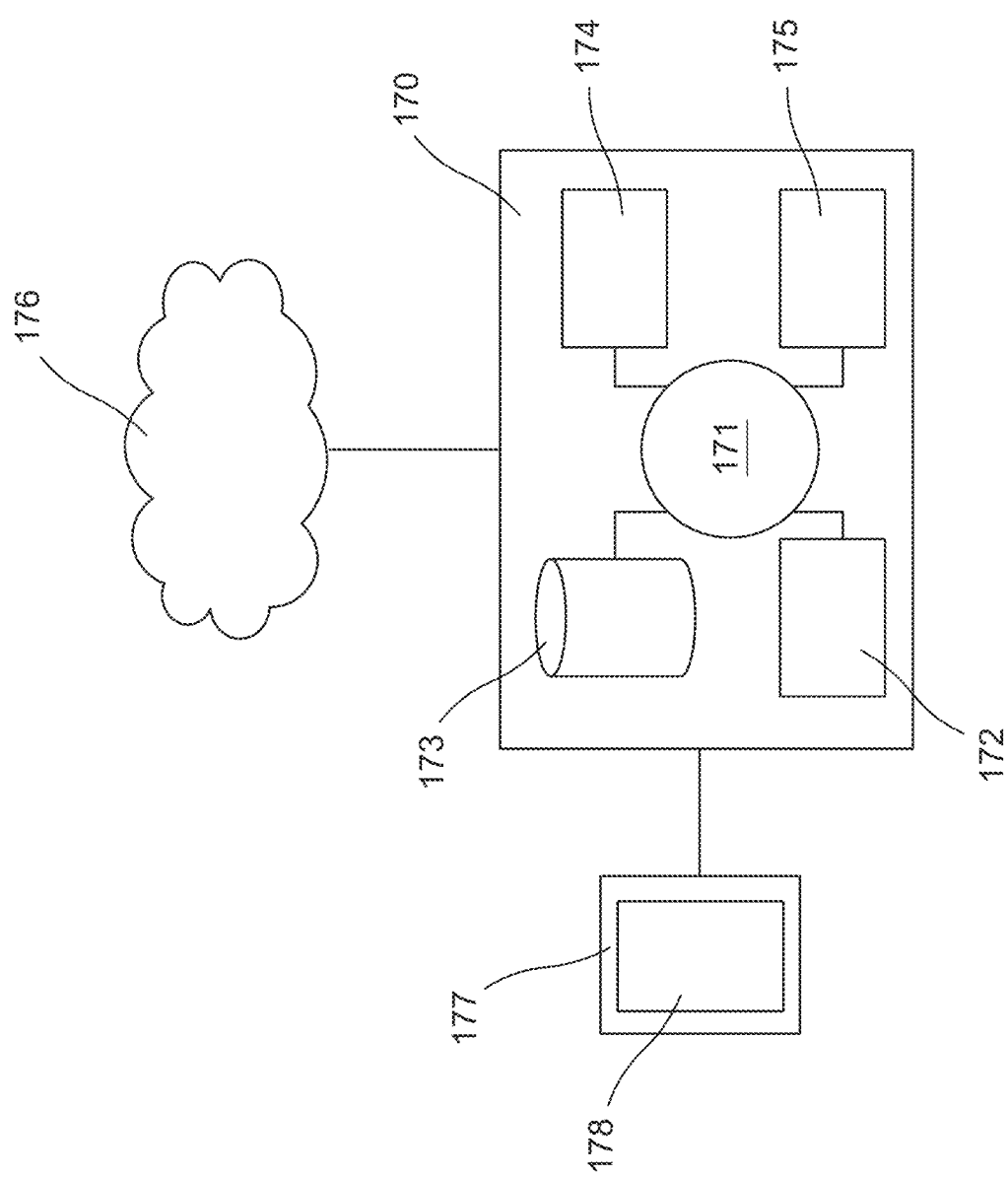

SYSTEMS AND METHODS FOR ELECTROPHORETIC SEPARATION AND ANALYSIS OF ANALYTES

CROSS-REFERENCE TO RELATED APPLICATIONS

This application claim priority to and the benefit of U.S. Provisional Patent Application Ser. No. 62/164,495 entitled, "Systems and Methods for Electrophoretic Separation and Analysis of Analytes," filed May 20, 2015, the disclosure of which is incorporated herein by reference in its entirety.

STATEMENT AS TO FEDERALLY SPONSORED RESEARCH

This invention was made with government support under Award number R43GM112236 awarded by The National Institutes of Health. The government has certain rights in the invention.

BACKGROUND

The present disclosure provides devices, systems, and methods for assaying a biological sample for a presence of one or more target analytes, such as target proteins.

Understanding cell-to-cell variation in protein expression is a large part of understanding the pathogenesis of tumors, characterizing the differentiation states of stem cells, and developing well-controlled and functionally-validated in vitro human 'disease in a dish' models for drug development, target screening, and toxicity studies. Single-cell analysis is of growing importance, but has been largely limited to transcriptome (e.g., RNA) and genome (e.g., DNA) technologies. Importantly, these measurements do not always correlate with the protein levels that dictate phenotype. Single-cell protein measurements represent an unsurmounted hurdle in stem cell, cancer, and immunology research.

Methods to determine protein level expression of a biological sample include electrophoresis followed by probe analysis. Electrophoresis is a technique that typically applies an electric field to a biological sample in a separation medium, such that individual molecules of the biological sample will disperse throughout the separation medium based on molecular size and charge. Cell lysis prior to electrophoresis, may reduce the biological sample to a set of individual molecules that can effectively separate throughout the separation medium. Cell lysis, electrophoresis, and subsequent probe analysis are typically executed on separate platforms with extensive user manipulation.

Thus, a need exists for devices, systems, and methods for assaying for a presence of various types of analytes using a single, self-contained system.

SUMMARY

An aspect of the present disclosure provides a system for assaying a biological sample for a presence of one or more target analytes, comprising a housing comprising (i) a receptacle that is configured to accept an electrophoresis cell having a recess area configured to accept a chip including a polymeric separation medium having activatable functional groups that covalently bond to the one or more target analytes when activated, wherein the chip accepts the biological sample; and (ii) a source of activation energy that supplies activation energy to activate the activatable functional groups. The system further comprises a computer controller operatively coupled to the source of activation energy and programmed to direct application of activation energy from the source of activation energy to the polymeric separation medium to activate the activatable functional groups.

In some embodiments, the electrophoresis cell is removable. In some embodiments, the chip is consumable. In some embodiments, the housing has a length that is less than about 50 cm, a width that is less than about 50 cm, and/or a height that is less than about 50 cm. In some embodiments, the length is less than about 40 cm, the width is less than about 40 cm, and/or the height is less than about 40 cm.

In some embodiments, the polymeric separation medium includes a plurality of microwells formed therein. In some embodiments, the microwells are dimensioned to accommodate a single cell from the biological sample in an individual microwell of the plurality of microwells, and wherein the individual microwell has a dimension of 100 $\square$m or less.

In some embodiments, the polymeric separation medium is cross-linked. In some embodiments, the activatable functional groups are benzophenone groups. In some embodiments, the activatable functional groups are activatable by electromagnetic radiation. In some embodiments, the electromagnetic radiation is visible light, ultraviolet (UV) light, or infrared light.

In some embodiments, the computer controller is included in the housing. In some embodiments, the computer controller is included in an electronic device that is remotely situated with respect to the housing. In some embodiments, the system further comprises a power source that provides power to the computer controller to assay the biological sample for the presence of the one or more target analytes.

In some embodiments, the source of activation energy is a source of ultraviolet radiation. In some embodiments, an external face of the source of activation energy comprises an optical filter. In some embodiments, the optical filter is configured to pass a subset of wavelengths compatible with the assaying through the optical filter. In some embodiments, the optical filter is configured to reduce condensation of buffer solution.

In some embodiments, the system further comprises an electronic display operatively coupled to the computer controller, wherein the electronic display has a user interface that permits a user to instruct the computer controller to assay the biological sample.

In some embodiments, the electrophoresis cell comprises one or more electrodes on opposing sides of the recess area. In some embodiments, the system further comprises a power source that provides power to the one or more electrodes to generate an electric field across the recess area. In some embodiments, the computer controller is programmed to direct field strength of the electric field across time. In some embodiments, the system further comprises a plurality of slots formed in the housing configured to accommodate one or more pins, wherein an electrical connection is formed when the one or more pins are adjacent to one or more conductive contact pads of the electrophoresis cell. In some embodiments, the computer controller is programmed to direct voltage polarity of each of the one or more pins to control a direction of the electric field. In some embodiments, the one or more pins are spring-loaded pins. In some embodiments, the plurality of slots is configured to accommodate a plurality of electrophoresis cell form factors and/or a plurality of electrode configurations. In some embodiments, the system further comprises one or more leveling sensors that permit a solution in the recess area to be leveled to reduce spatial perturbations in the electric field. In some embodiments, the system further comprises one or more leveling indicators that provide an indication as to a degree of leveling of the solution in the recess area.

In some embodiments, the system further comprises a sensor operatively coupled to the computer controller, wherein the sensor permits identification of one or more identification members on the chip inserted into the receptacle. In some embodiments, the one or more identification members include one-dimensional or two-dimensional identification barcodes. In some embodiments, the one or more identification members include radio frequency identification (RFID) units. In some embodiments, each of the one or more identification members is unique. In some embodiments, the system further comprises memory coupled to the computer controller, wherein the memory stores an identification of the one or more identification members. In some embodiments, the computer controller is programmed to transmit or retrieve an identification of the one or more identification members from memory of a remote computer system. In some embodiments, a first identification member of the one or more identification members determines a first set of assay parameters for the assaying. In some embodiments, the computer controller is programmed to upload a given identification member and/or a set of assay parameters. In some embodiments, the sensor is an optical sensor that optically identifies the one or more identification members.

In some embodiments, the housing further comprises a source of solution. In some embodiments, the computer controller is programmed to direct flow of a solution from the source of solution to the chip. In some embodiments, the system further comprises one or more valves operatively coupled to a reservoir of the source of buffer solution, wherein the computer controller is programmed to open or close the one or more valves to direct the flow of the solution from the reservoir to the chip. In some embodiments, the solution is a buffer solution. In some embodiments, the computer processor is programmed to separately introduce at least a first solution and a second solution from the source of solution to the chip. In some embodiments, the computer processor is programmed to separately introduce two or more solutions sequentially from the source of solution to the chip.

In some embodiments, the system further comprises one or more interlocking switches. In some embodiments, locking the one or more interlocking switches permits activation of the source of activation energy. In some embodiments, locking the one or more interlocking switches permits activation of a power source.

In some embodiments, the system further comprises one or more weir structures formed in the electrophoresis cell. In some embodiments, the one or more weir structures trap bubbles on a top surface of the chip. In some embodiments, the one or more weir structures prevent bubbles from floating on a top surface of the chip. In some embodiments, the one or more weir structures reduce perturbation in the electric field, reduce blockage of wavelengths generated by the source of activation energy, dampen fluid motion of buffer solution, or combinations thereof.

In some embodiments, the system further comprises a rinsing fixture, wherein an angle of the rinsing fixture controls a flow rate of buffer solution to the chip. In some embodiments, the system further comprises a probing fixture adjacent to the chip. In some embodiments, the system further comprises one or more pouring or spout features formed in the electrophoresis cell to aid in emptying the electrophoresis cell.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various respects, all without departing from the disclosure. Accordingly, the drawings and description are to be regarded as illustrative in nature, and not as restrictive.

In some embodiments, a system for assaying a biological sample for a presence of a target analyte includes an assaying device and a computer controller. The assaying device includes a housing, a receptacle disposed in the housing, and a source of activation energy. The receptacle is configured to accept an electrophoresis cell. The electrophoresis cell has a recess area configured to accept a chip configured to accept the biological sample. The chip includes a polymeric separation medium with activatable functional groups that covalently bond to the target analyte when activated. The source of activation energy is configured to supply activation energy to activate the activatable functional groups. The computer controller is operably coupled to the source of activation energy and is configured to activate the source of activation energy to direct an application of activation energy to the polymeric separation medium to activate the activatable functional groups.

In some embodiments, an apparatus includes a housing, a receptacle, a radiation energy source, an electric power source, and a computer controller. The housing includes a base and a lid. The receptacle is defined by an interior surface of the base and is configured to receive an electrophoresis cell. The electrophoresis cell is configured to be coupled to a chip including a polymeric separation medium with functional groups configured to covalently bond to a target analyte within a biological sample disposed on the chip in response to being activated. The radiation energy source is coupled to an interior surface of the lid and is configured to supply activation energy operable to activate the functional groups. The electric power source is disposed within the housing and fluidically isolated from the receptacle. The electric power source is configured to be electrically coupled to the electrophoresis cell when the electrophoresis cell is disposed in the receptacle. The computer controller is coupled to the housing and fluidically isolated from the receptacle. The computer controller is operable to activate the radiation energy source and the electric energy source when the electrophoresis cell is disposed in the receptacle to assay the biological sample.

In some embodiments, an electrophoresis cell is configured to be disposed within a receptacle of an assay device to assay a biological sample for a presence of a target analyte. The electrophoresis cell includes a body, a chip, a conductive contact pad, an electrode, and a weir structure. The body defines a recess area configured to receive the chip such that a surface of the chip is substantially flush with a surface of the body. The chip including a polymeric separation medium with functional groups configured to covalently bond to a target analyte within the biological sample disposed on the chip in response to being activated. The conductive contact pad is coupled to the body and is configured to be electrically connected to a power supply of the assay device when the electrophoresis cell is disposed within the receptacle. The electrode is disposed within the body and is electrically connected to the conductive contact pad. The electrode is configured to produce an electric field across the recess area in response to a flow of electric current from the power supply when the electrophoresis cell is disposed within the receptacle. The weir structure is disposed within the body on at least one side of the recess area. The weir structure is configured to control a flow of a solution across the recess area.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings (also "figure" and "FIG." herein), of which:

FIG. 3 illustrates a receptacle of the main unit 100 of FIG. 2 that holds a modular electrophoresis cell which itself may contain a removable chip.

FIGS. 5A and 5B illustrate cross-sectional views of the modular removable electrophoresis cell of FIG. 4, containing a removable chip.

FIG. 10 illustrates a rinsing fixture according to an embodiment.

FIG. 11 shows a computer control system that is programmed or otherwise configured to implement any of the methods provided herein.

DETAILED DESCRIPTION

Figure 1:
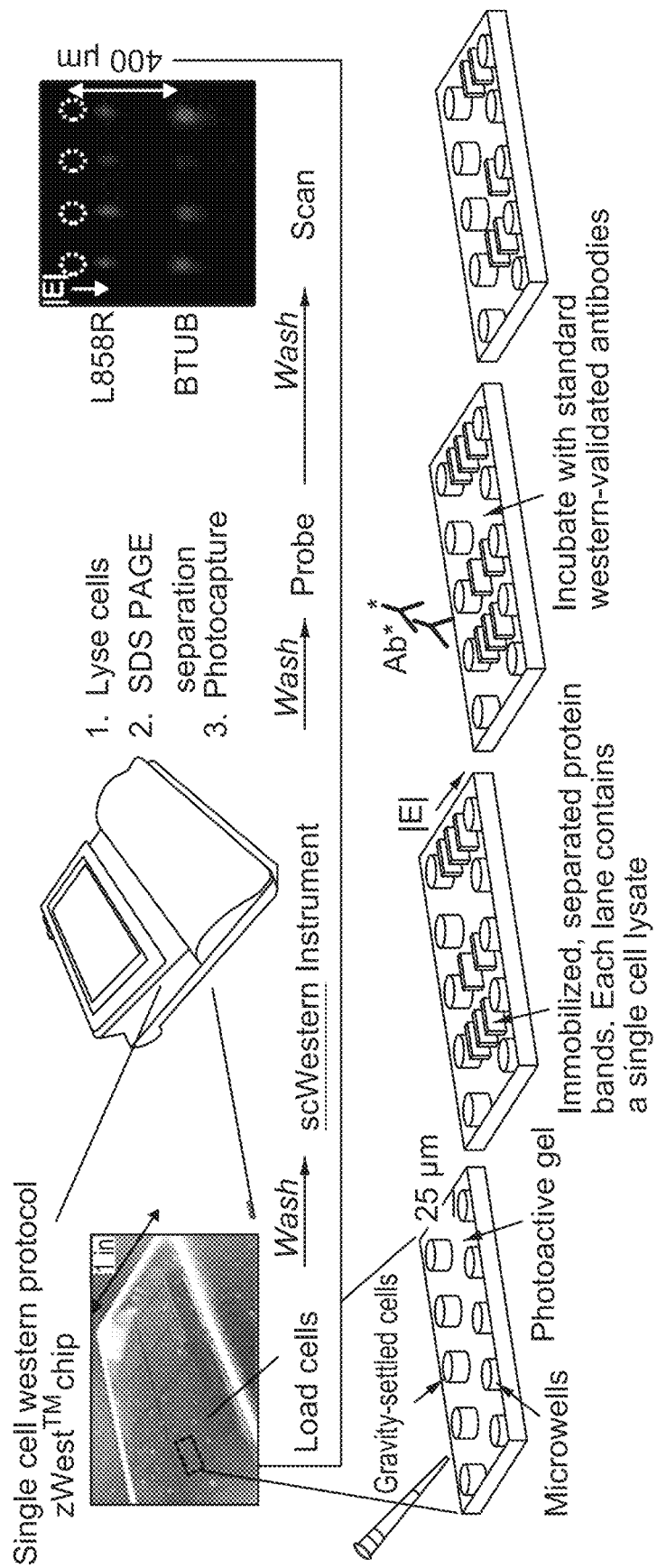
FIG. 1 illustrates a single cell Western Blotting (scWB) array image and assay workflow schematic, according to an embodiment.

While various embodiments of the present disclosure have been shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments of the present disclosure described herein may be employed.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the term "protein" refers to proteins, oligopeptides, peptides, and analogs, including proteins containing non-naturally occurring amino acids and amino acid analogs, and peptidomimetic structures.

As used herein, the term "analyte" refer to any molecule or compound to be detected, as described herein. Suitable analytes can include but are not limited to, small chemical molecules such as, for example, environmental molecules, clinical molecules, chemicals, pollutants, and/or biomolecules. More specifically, such chemical molecules can include but are not limited to pesticides, insecticides, toxins, therapeutic and/or abused drugs, hormones, antibiotics, antibodies, organic materials, proteins (e.g., enzymes, immunoglobulins, and/or glycoproteins), nucleic acids (e.g., DNA and/or RNA), lipids, lectins, carbohydrates, whole cells (e.g., prokaryotic cells such as pathogenic bacteria and/or eukaryotic cells such as mammalian tumor cells), viruses, spores, polysaccharides, glycoproteins, metabolites, cofactors, nucleotides, polynucleotides, transition state analogs, inhibitors, nutrients, electrolytes, growth factors and other biomolecules and/or non-biomolecules, as well as fragments and combinations thereof. Some analytes described herein can be proteins such as enzymes, drugs, cells, antibodies, antigens, cellular membrane antigens, and/or receptors or their ligands (e.g., neural receptors or their ligands, hormonal receptors or their ligands, nutrient receptors or their ligands, and/or cell surface receptors or their ligands).

As used herein, the term "sample" refers to a composition that contains an analyte or analytes to be detected. A sample can be heterogeneous, containing a variety of components (e.g., different proteins) or homogenous, containing one component. In some instances, a sample can be naturally occurring, a biological material, and/or a man-made material. Furthermore, a sample can be in a native or denatured form. In some instances, a sample can be a single cell (or contents of a single cell) or multiple cells (or contents of multiple cells), a blood sample, a tissue sample, a skin sample, a urine sample, a water sample, and/or a soil sample. In some instances, a sample can be from a living organism, such as a eukaryote, prokaryote, mammal, human, yeast, and/or bacterium or the sample can be from a virus. In some instances, a sample can be one or more stem cells (e.g., any cell that has the ability to divide for indefinite periods of time and to give rise to specialized cells). Suitable examples of stem cells can include but are not limited to embryonic stem cells (e.g., human embryonic stem cells (hES)), and non-embryonic stems cells (e.g., mesenchymal, hematopoietic, induced pluripotent stem cells (iPS cells), or adult stem cells (MSC)).

The term "level," as used herein, generally refers to variation from a plane that is orthogonal to the gravitational acceleration vector.

The present disclosure is directed to automated systems for performing analyte detection, such as western blotting. Systems provided herein can be used to detect analytes in samples of substantially low volume, such as single cell analysis. In some examples, such analysis can be performed using single cell western blotting (scWB), which employs microfluidic design to introduce tried-and-true microarray formats that combine: (i) protein molecular weight determination via electrophoresis with (ii) protein identity determination via subsequent antibody-based probing of resolved protein bands. This two-stage assay can include western blotting. This two-stage analysis can offer ultra-high specificity performance at the bench, without the need for costly infrastructure or core facilities. The scWB brings high-specificity protein assays to single-cells, while taking advantage of the vast reagent infrastructure already available for conventional western blotting.

Widespread implementation of scWB can impact biomedicine through: a) elucidating intratumor cell-to-cell heterogeneity, thus advancing therapeutic efficacy of cancer drugs; b) assessing patient-specific cell-level response for companion diagnostics to targeted therapy drug cocktails; c) quantifying the purity and safety of cell-based therapies before implantation, which may accelerate regulatory approval and lead to the creation of safer, more effective cell-based therapies; d) enabling analysis of rare cell populations from patients (e.g., circulating tumor cells, CTCs) for targeted therapies; and e) enabling characterization of rare cell therapies such as iPSC-derived somatic cells to accelerate creation of functional tissues and in vitro disease models for drug development. Single-cell western-based protein-level information may provide a transformative leap towards realizing personalized and regenerative medicine.

To achieve microarray-like density of single-cell resolution western blots, the scWB can use a microscope slide coated with a thin photoactive polymer stippled with thousands of microwells having a diameter that is about 100 microns or less. In some embodiments, each microwell can have a diameter in a range of about 15 microns to about 45 microns in diameter (see e.g., FIG. 1). The chip can be fabricated using soft lithography. The chip can be removable, consumable, disposable, or combinations thereof. The chip can be a scWB chip. The scWB workflow can initiate when a cell suspension is dispensed on top of the microwell array having a gel, with single cells settling into individual microwells passively under the action of gravity. Microwell occupancy can be controlled by limiting dilution and microwell design (e.g., microwells sized to accommodate single cells). After cell lysis and application of an electric field across the gel, the photo-active gel, which can comprise benzophenone-methacrylamide, can act as a sieving matrix that separates molecules (such as proteins) according to their molecular weight over short separation distances (<1 mm). With a brief UV exposure, the benzophenone-methacrylamide co-monomer can covalently immobilize proteins via hydrogen abstraction, which can yield capture efficiencies approaching 100%. Thus, protein bands can be fixed in position in the gel after the size-based separation and subsequently the gel can be probed with antibodies which can obviate the transfer and blocking steps typically used in traditional western blotting approaches. In some instances, a scWB can be performed without pumps, valves, precise alignment or complex electrical or pneumatic interfaces typically found in scWB systems (e.g., mass spectrometers, mass cytometry, flow cytometers, etc.). Multiplexing of targets can be achieved by size separation, multispectral detection, and/or repeated stripping and re-probing of the captured proteins.

On one microscope slide, thousands or more of single cells can be assayed in parallel and as little as about 1-10 femtograms or less of target protein per cell can be detected which, in some instances, can impart higher throughput and analytical sensitivity than mass spectrometry. Given the widespread use of conventional western blotting and less strict antibody specificity requirements, about 10 times more commercially-available antibodies can be validated for western blotting as compared to flow cytometry. Cell lysis can allow for measurement of diverse targets such as intracellular proteins, protein complexes, and post-translational modifications that may not accessible using flow cytometry.

Flow cytometry is an established single-cell proteomic tool with high throughput. Yet flow cytometry can require high antibody specificity and intracellular proteins can be more challenging to detect. Mass cytometry can make single-cell proteomic measurements but may use custom heavy metal-tagged antibodies, expensive instrumentation (e.g., $600,000 per instrument) and high antibody specificity. Mass spectrometry is emerging as a single-cell analysis tool, yet it may require expert spectra interpretation, and can have low throughput and low analytical sensitivity. Automated western blotting instrumentation exists but is unable to reach single-cell resolution. In some instances, this is attributable in part to capture efficiencies of about 0.01% versus about 100% for the scWB.

In some embodiments, a system for scWB can include instrumentation that can integrate the electrophoresis and UV capture steps. The present disclosure described here also provides for safety interlocking (to prevent user exposure to hazardous high voltage and UV light) and enables integrated electrophoresis and UV exposure on a microscope slide format. While the initial application of the instrument can perform the scWB assay, the same present disclosure can enable related assays such as small volume (but not single-cell) western blotting or small volume, parallel electrophoresis assays.

The present disclosure provides a system for performing electrophoretic separations and photocapture of separated molecules within a thin gel attached to a planar substrate. The system can perform single-cell resolution western blotting (scWB) in a thin (<100 micron thick) gel layer on a microscope slide. In some embodiments, the system can perform assays as described in, for example, PCT Patent Publication No. WO2014/138475 entitled, "Electrophoretic Separation Devices and Methods for Using the Same," filed Mar. 6, 2014, the disclosure of which is incorporated herein by reference in its entirety. The present disclosure can be a system comprising an instrument, software, associated accessories, and assay methods.

Figure 2:
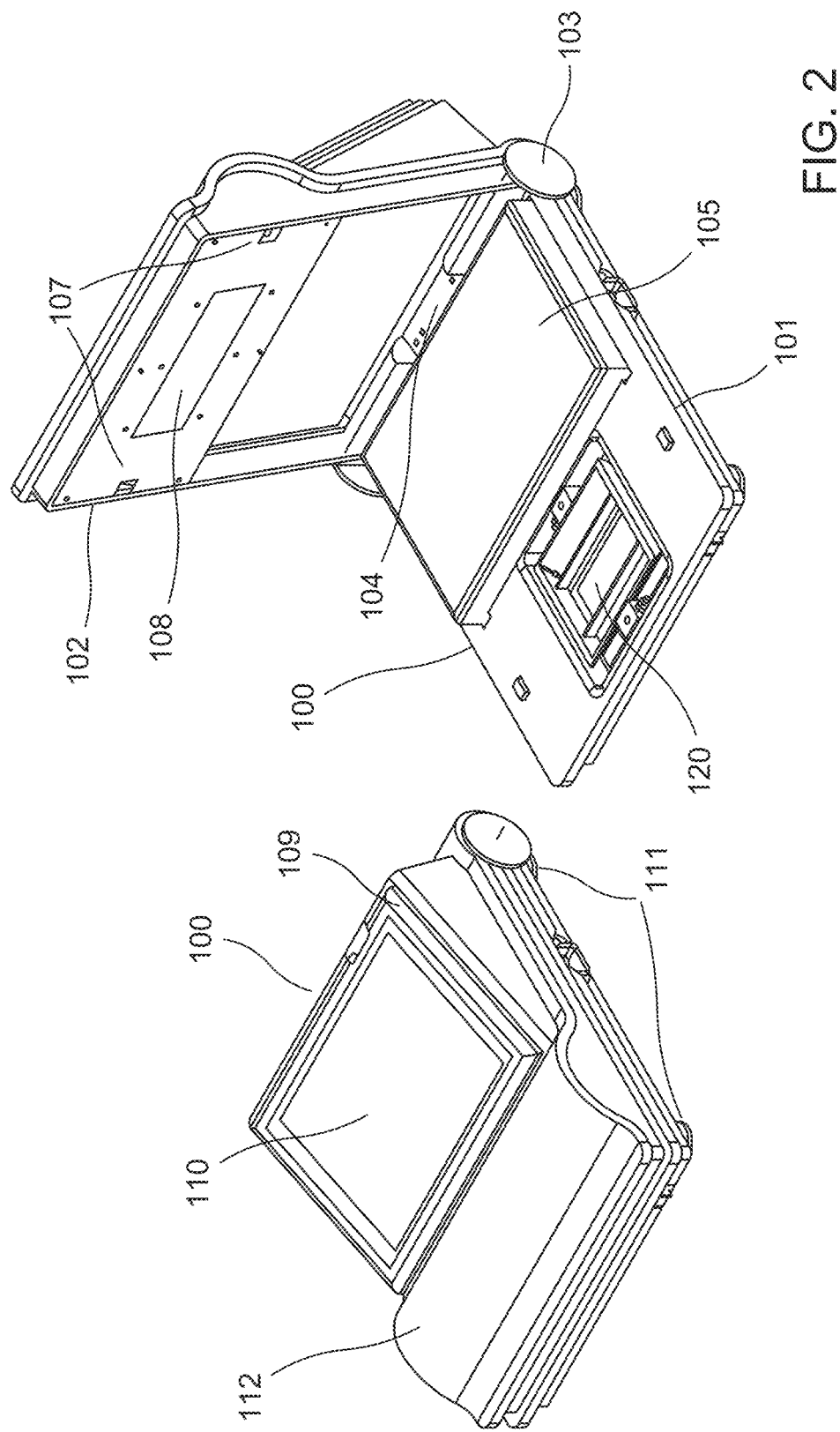
FIG. 2 illustrates a main unit of a scWB apparatus, according to an embodiment.

The system is shown in FIG. 2. The main unit 100 (also referred to herein as "instrument" and/or "device") can be comprised of a base 101, a lid 102, an integrated computer (such as a tablet computer with a touch screen, 110), a high voltage power supply (that can be contained in a compartment 105) and a source of activation energy (e.g., radiation energy) such as an ultraviolet (UV) light source 108. The main unit 100 is configured to receive an electrophoresis cell 120 and can be used to perform an assay on a biological sample included in and/or otherwise contained by the electrophoresis cell 120, as described in further detail herein. The system can be controlled by a computer, microprocessor or microcontroller which can either be integrated into the main unit 100 or separate from but in communication with the main instrument body or housing (e.g., through a wired or wireless data connection). Integration of a computer with the instrument body can allow for flexible integration of instrument control and data management in a compact form. For example, the tablet computer 110 can have a built-in sensor (e.g., camera) that can be used to read barcodes printed on a chip, for example, a scWB consumable chip. The chip can be adapted, configured, or otherwise suitable for use in scWB. The sensor can be used to read or identify one or more identification members, such as identification numbers, on the removable electrophoresis cell. Each of the one or more identification members can be unique. The one or more identification members can include one-dimensional or two-dimensional identification barcodes. The one or more identification members can include radio frequency identification (RFID) units. The sensor can store the one or more identification members, such as identification numbers, in memory coupled to the computer processor. The memory can be part of the system or a remote computer system, such as a remote server in network communication with the system (e.g., the "cloud"). A first identification member of the one or more identification members can determine a first set of assay parameters for the assaying. The computer processor can be programmed to upload the first unique identification member, the first set of assay parameters, or a combination thereof to a computer network. In some cases, the instrument can include detection of the presence of one or more target analytes and the computer processor can be programmed to upload the presence of one or more target analytes. The barcode can then be used to determine a set of assay parameters to be used for running the barcoded chip. Once the run is complete, the tablet can upload run information along with the barcode to a computer network, such as a network server. The server can later be accessed by a separate reader instrument so that imaging data and electrophoresis run data can be associated with the same chip through the barcode.

The main unit 100 can include a frame 109 which can position and hold the touch screen or tablet computer 110 and can hide any cable connections to the tablet computer or screen. The source of activation energy, such as the UV light source 108, can be a fluorescent bulb, LED, an Hg—Xe source, or other common sources. The instrument body can include a curved surface 112 to accommodate a cylindrical-shaped UV source (such as a fluorescent lamp) while maintaining a compact and aesthetically pleasing profile. The exterior face of the UV light source 108 can be an optical filter or a window that can reduce the light intensity (e.g., a neutral density filter) or that can control the wavelengths of light that pass through such that optimal wavelengths can reach the scWB consumable chip. The filter or window can be heated or treated with a coating to reduce condensation of buffer during electrophoresis.

In some embodiments, sensitive and high voltage components can be sealed within a separate compartment 105 so that any liquid (e.g., buffer solution) spilled inside the instrument 100 cannot come in contact with the electronics. In such an example, air cooling and venting can occur from the bottom of the instrument. The lid 102 can rotate open about axis 103 and can be supported by a friction hinge 104 which can allow the lid 102 to stay open at various angles. The lid 102 can close if opened less than a threshold angle (e.g., 10 degrees or any other suitable angle). The lid 102 may include dampening mechanisms to slow the lid 102 closure, and can latch closed using one of various methods known to one skilled in the art (e.g., magnetic or mechanical latches). Leveling feet 111 can be used to level the instrument base 101 such that liquid (e.g., buffer solution) in the electrophoresis cell 120 can be level. Leveling can be accomplished by placing a standard bubble level in the electrophoresis cell 120 while adjusting the leveling feet 111 or the instrument 100 can include a permanently mounted bubble level or an electronic leveler that can interface to the computer 110 which in turn can inform the user if the instrument 100 is level. In some embodiments, the instrument 100 can include any suitable device and/or mechanism configured to automatically or at least semi-automatically level the instrument.

In an example, a chip 140 (FIG. 5B), such as a disposable or consumable chip that is 75 mm long, being 1 degree "off level" can have a fluid height that can vary by 1.3 mm across the top of the chip. If the nominal height of the fluid is only 3 mm, then being off level can result in about a 40% variation in fluid height which can result in a 40% variation in the electric field.

Interlock switches 107 can ensure that the lid 102 is closed before hazardous UV and high voltage (HV) are enabled. The instrument 100 can be configured to disconnect the HV power supply from the pogo pins 114 when the lid 102 is opened and/or the HV supply can be disabled and the residual charge can be dissipated to ground. The main body of the instrument 100 may include vents which can prevent accumulation of explosive electrolysis gases inside the instrument body. Light blocking features (such as a raised rim around the base 101 of the instrument 100) may be included, which can minimize any leakage of UV light when the lid 102 is closed.

As shown in FIG. 3, the main instrument body or housing can include a receptacle 106 that can hold an electrophoresis cell 120. In some instances, the electrophoresis cell 120 can be modular, removable, or a combination thereof. In an example, an electrophoresis cell, such as the modular removable electrophoresis cell 120 can be aligned using one or more alignment pins 113 which can interface to corresponding slots and/or holes on the modular removable electrophoresis cell 120. This modular design can allow for any number of removable electrophoresis cell designs to be used in the main instrument unit 100. Some such designs can accommodate different chips which can fit into a recess area 121 of the electrophoresis cell 120, different electrode configurations, or electrical resistance that can simulate a filled removable electrophoresis cell to allow for convenient dry testing of the system. In some embodiments, any number of slots can be formed in the main instrument body or housing to accommodate the one or more pins. An electrical connection can be formed when one or more pins are adjacent to the one or more conductive pads of the removable electrophoresis cell 120. In an example, the slots can be configured to accommodate various removable electrophoresis cell form factors and/or various electrode configurations. In an example, the slots can remain spatially fixed and the pin configuration can be modular. In another example, the slots and pin configuration of the housing can remain spatially fixed and the configuration of the contact pads of the modular removable electrophoresis cell can also remain spatially fixed. In this example, the electrical connections and mechanical features within the modular electrophoresis cell can be reconfigured for different functions, such as a plurality of removable electrophoresis cell designs.

Electrical connection can be made to the removable electrophoresis cell 120 via spring-loaded pins, i.e., "pogo pins," 114 which can connect to conductive contact pads 122 on the electrophoresis cell 120. This interface can allow for dry contact to the HV pogo pins 114. The electrical contact pads 122 can be connected to conductors (for example, platinum or carbon conductors) which can contact the liquid (e.g., buffer solution) in the removable electrophoresis cell 120. The instrument 100 can control the voltage difference between the pogo pins 114 such that the electric field strength in the removable electrophoresis cell can be programmatically controlled. In an example, the instrument 100 can programmatically change the polarity of the pogo pin voltages such that the direction of the electric field within the removable electrophoresis cell can also be controlled via software. Additional pins and contact pads may be added to accommodate different removable electrophoresis cell designs, if more than two voltages are needed. Although not shown, in some embodiments, the receptacle 106 is surrounded by a grounding ring such that any fluid that spills outside of the electrophoresis cell 120 during operation will be electrically grounded once it crosses over the grounding ring. The grounding ring can be any suitable shape, size, and/or configuration and can be formed from any suitable grounding material.

The receptacle 106 and removable electrophoresis cells can be transparent such that an additional UV light source can be included below the receptacle 106. The transparent surfaces can include lens elements to help focus light from a UV source. The imaging instrumentation (e.g., lenses, cameras, photodetectors, etc.) can be included below the receptacle 106. The imaging instrumentation can enable brightfield or fluorescence imaging of the chip, before, during, or after electrophoresis. In an example, the surface of the receptacle 106 can be reflective such that UV light from the UV source 108 can be reflected back to the chip to increase the UV flux. In another example, the surface of the receptacle 106 can include ultrasonic transducers (or the like) which can transmit energy to a chip seated in the recess area 121 and can assist in lysis of cells contained within the chip. In a further example, the receptacle 106 can incorporate temperature control (heaters and/or coolers) to assist with lysis, to control heating during electrophoresis, or to provide temperature cycling or control for desired chemical reactions (e.g., for melting or annealing of nucleic acid-tagged detection probes).

Figure 4:
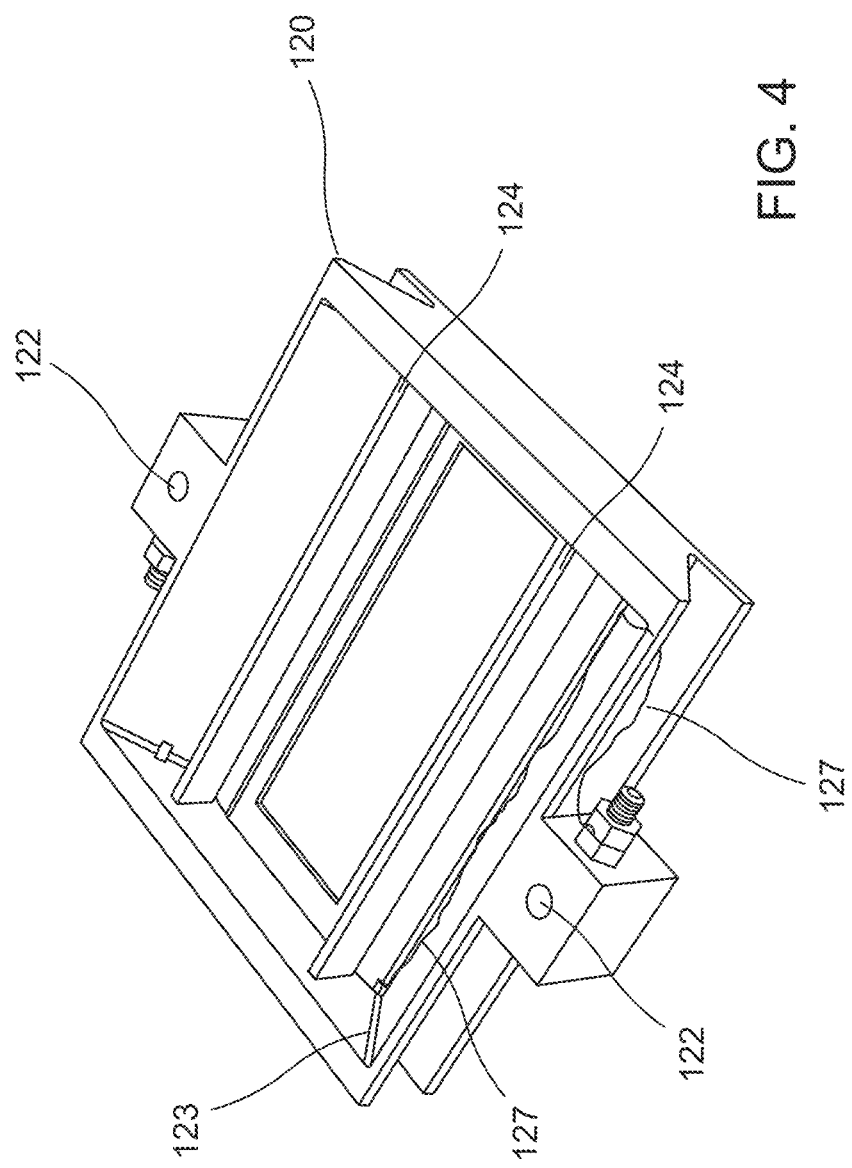
FIG. 4 illustrates one embodiment of a modular removable electrophoresis cell configured for use in the main unit 100 of the scWB apparatus of FIG. 2.

FIG. 4 shows an example of an electrophoresis cell, such as the removable electrophoresis cell 120. The removable electrophoresis cell 120 can have a body 120A that defines the recess area 121 designed to accommodate a chip 140, an example of which can be a scWB consumable chip having outer dimensions equal to a standard microscope slide. Conductive contact pads 122 are coupled to the body 120A and can provide an electrical interface to the instrument. Platinum wire 127 can connect from the contact pads 122 into the body 120A of the removable electrophoresis cell 120. The platinum wire 127 can be inserted into nonconductive tubing such that the portion of the wire 127 outside of the removable electrophoresis cell 120 can be electrically insulated while at least of portion of the tubing can be removed so that the platinum wire 127 inside of the removable electrophoresis cell 120 can be exposed to facilitate contact with the buffer. To maximize activation energy flux onto the scWB consumable chip 140, the removable electrophoresis cell 120 can be shallow to minimize the distance between the top of the slide and the source of activation energy, such as a UV source. The removable electrophoresis cell 120 can incorporate features to avoid wicking of the electrophoresis buffer outside of a shallow removable electrophoresis cell 120. For example, internal corners 123 may be radiused to reduce wicking. In an example, the removable electrophoresis cell 120 can include pouring or spout features to aid in emptying the removable electrophoresis cell when the assay is complete.

FIGS. 5A and 5B show a cross-sectional view of an electrophoresis cell, such as a modular removable electrophoresis cell 120. The chip 140 can sit flush inside of the recess area 121 such that the thin gel layer on the top surface of the chip 140 can be level with the bottom of the removable electrophoresis cell 120. In an example, the chip 140 can sit flush within the recess area 121 to minimize or eliminate changes in height that can cause electric field distortions or perturbations near the edge of the chip 140. Electric field distortions or perturbations can cause variations in the migration distance and in the direction of protein bands that are separated in the chip 140. Electrical field distortions can be spatial distortions or perturbations, such as distortions near the edge of the chip 140. Electrical field distortions can be temporal distortions or perturbations, such as bubbles passing over the chip 140. Electrical current can be proportional to a fluid height 131 and the fluid can absorb some of the UV light from the UV light source 108. In some instances, the fluid or liquid height (e.g., buffer solution height) can be minimized. Selection of the electrophoresis cell dimensions can minimize liquid height. The fluid height 131 may be less than about 50 millimeters (mm), 20 mm, 30 mm, 10 mm, 8 mm, 6 mm, 5 mm, 4 mm, 3 mm, 2 mm, or 1 mm. In some instances, a distance 132 between the chip 140 and the top of the removable electrophoresis cell 120 can be reduced to increase the flux of UV light from the UV light source 108 onto the chip 140. The electrophoresis cell dimensions may be selected so as to reduce the fluid height 131 and increase the flux or power of UV light.

The distance 132 may be less than or equal to about 25 mm, 20 mm, 15 mm, 14 mm, 13 mm, 12 mm, 11 mm, 10 mm, 5 mm, 4 mm, 3 mm, 2 mm, or 1 mm. In some instances, the distance 132 is between about 1 mm and 50 mm, or 5 mm and 20 mm.

The removable electrophoresis cell 120 can be designed so that the depth of the electrophoresis buffer 130 is deeper near the electrodes 128 such that the electrodes can be covered by the electrophoresis buffer while allowing for a smaller fluid height 131 above the chip 140. In some instances, the electric field strength and migration distances can vary across the chip 140 unless the liquid (e.g., buffer solution) height 131 is uniform across the chip 140. In the example shown in FIG. 5B, a uniform liquid height 131 can be achieved by leveling the removable electrophoresis cell 120, e.g., using a bubble level or electronic level while adjusting the instrument feet 111, while the fluid height 131 can be controlled by the volume of electrophoresis buffer 130 that is added to the removable electrophoresis cell 120. Leveling features can be attached to the modular removable electrophoresis cell 120 or be integrated into the receptacle 106 such that the removable electrophoresis cell 120 can be leveled independent of the main instrument body or housing 100.

In an example, the removable electrophoresis cell 120 can be configured such that the lid 102 defines the fluid height 131 by creating a fixed distance between the lid 102 and surface of the chip 140. Excess liquid (e.g., buffer solution) can be displaced such that the fluid height 131 is no longer a function of the volume of electrophoresis buffer 130 or whether or not the removable electrophoresis cell 120 is level. The fluid height 131 can be controlled by spillover features so that once the target fluid level is reached, excess buffer can flow over the spillover feature into a reservoir such that the excess buffer addition does not change the fluid height 131.

The modular removable electrophoresis cell 120 can incorporate one or more weir structures 124. These weir structures 124 can prevent electrolysis bubbles, which can be generated at the electrodes 128, from drifting over the chip 140. Bubbles above the chip 140 can distort or perturb the electric field and may block activation energy (e.g., UV light) from the source of activation energy (e.g., UV light source) 108. When the electrophoresis buffer is poured into the removable electrophoresis cell in the region above the electrodes 128, the weir structures 124 can prevent bubbles already present in the buffer from flowing across the chip 140. The weir structures 124 can help dampen fluid motion after pouring such that the buffer 130 can become quiescent more rapidly than in a removable electrophoresis cell 120 without one or more weir structures. In some instances, the dampening of fluid motion can be important to reduce loss of proteins from the microwells during lysis. The removable electrophoresis cell 120 can further incorporate a sieve or one or more other features that filter out bubbles already present in the electrophoresis buffer or generated by electrolysis.

The modular removable electrophoresis cell 120 can comprise one or more structures (126A, 126B) to capture and restrain the electrode wire 127. A hole 125 in the wall of the removable electrophoresis cell 120 can allow the electrode wire 127 to pass through the wall and to connect electrically to the contact pads 122. The wire 127 can be sheathed in a nonconductive tube (such as polytetrafluoroethylene (PTFE)). The wire 127 can be sheathed in a nonconductive tube at the point where it passes through the hole 125 such that the wire 127 can be electrically insulated outside of the cell 120.

In some instances, when loading the chip 140, such as a disposable chip, into the modular removable electrophoresis cell 120, air can be trapped under the chip 140. Air may remain trapped when the electrophoresis buffer is added to the removable electrophoresis cell 120 and can result in the chip 140 floating up or bubbles escaping along the edges of the chip 140 during electrophoresis, which can distort or perturb the electric field. A droplet of buffer (e.g., 50-300 microliters) can be added to the recess area 121. In some instances, a droplet of buffer can be added to one side of the recess area 121 or can be added prior to loading the chip 140 into the recess area 121 after which the chip 140 can be lowered into the recess area 121, allowing the liquid drop to wick underneath the chip 140 to exclude any trapped air. The surface tension of the liquid (e.g., buffer solution) under the slide (e.g., chip) can hold the slide in the recess area 121 until the electrophoresis buffer can be added to the cell 120. The recess area 121 can be opaque or dark color which can increase the visual contrast between the air and liquid under the chip 140.

Figure 6A:
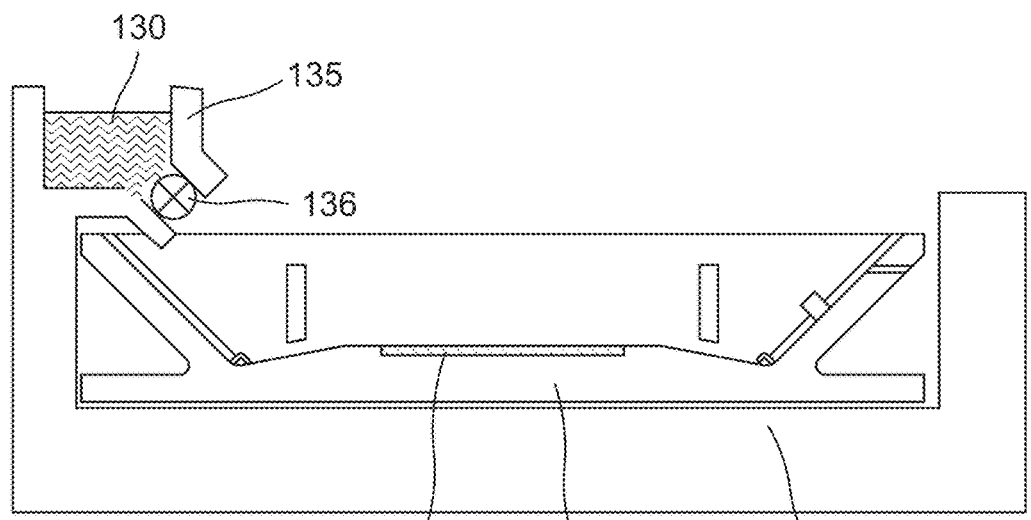
FIGS. 6A-6C and 7A-7C illustrate cross-sectional views of the modular removable electrophoresis cell of FIG. 4, in fluid communication with a reservoir and valve features for addition of one or more buffer solutions into the reservoir of the modular removable electrophoresis cell of FIG. 4.
Figure 6B:
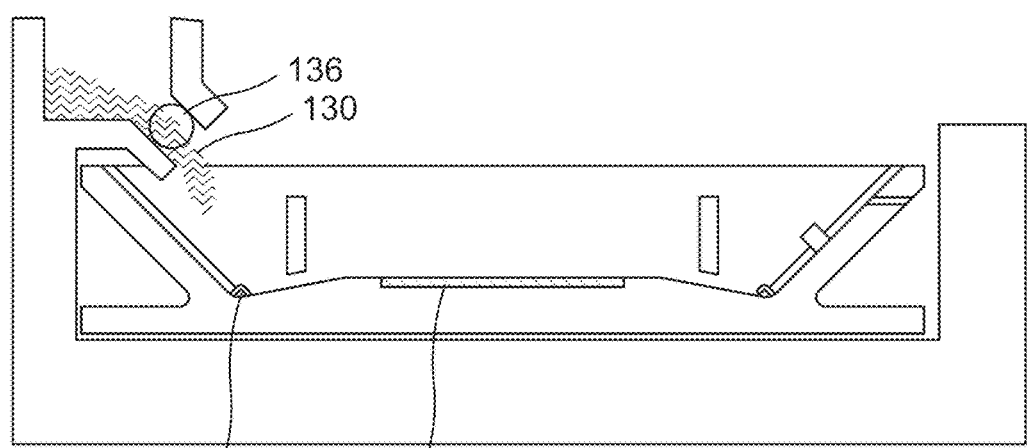
Figure 6C:
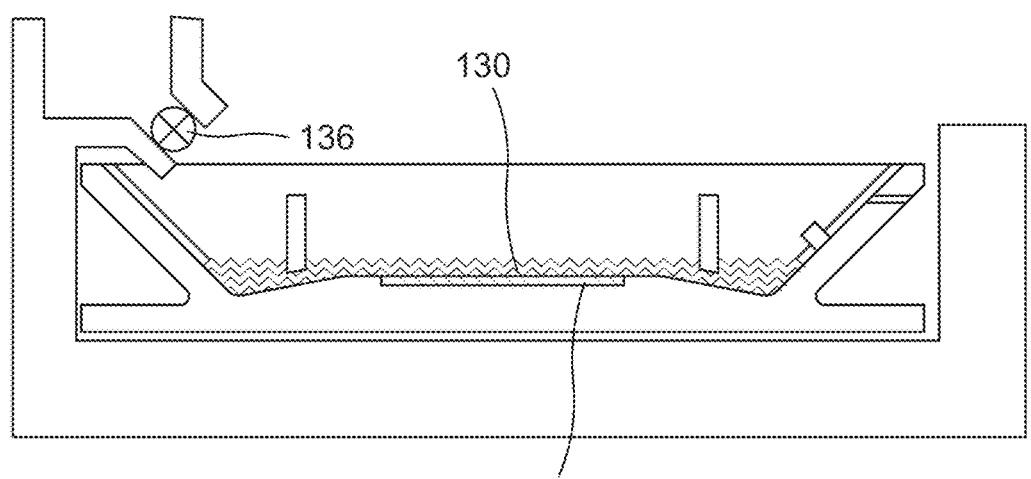

FIGS. 6A-6C show how a dual-purpose electrophoresis/lysis buffer can be added to an electrophoresis cell, such as the modular removable electrophoresis cell 120. In some examples, the dual-purpose buffer 130 can be added manually wherein the user can pour the buffer 130 into the modular removable electrophoresis cell 120 in the region above the electrode 128, can close the instrument lid 102, and can initiate the assay through the integrated computer 110. Cell lysis can occur when the dual-purpose buffer 130 is poured into the removable electrophoresis cell 120. The user can initiate the run after adding the dual-purpose buffer 130.

The instrument 100 can include a reservoir 135 which can contain the dual-purpose buffer 130 (FIG. 6A). The reservoir can have an initially closed valve 136 which can prevent the buffer 130 from exiting the reservoir. The software can programmatically control the release of the buffer 130 by opening a valve 136 allowing the buffer 130 to drain into the modular removable electrophoresis cell 120 (FIG. 6B). The computer processor may separately introduce a first solution and a second solution from the source of solution to the chip. The first and second solutions may be different, such as a lysis buffer and an electrophoresis buffer. Alternatively, the first and second solutions may be the same, such as washing buffers.

The computer processor may be programmed to separately introduce two or more sequential solutions from the source of solution to the chip. The two or more sequential solutions may be the same. As an alternative, the two or more sequential solutions may be different. In some instances, one or more solutions are manually introduced to the chip. As an alternative, one or more solutions are manually introduced and one or more solutions are programmatically introduced when the computer processor opens the reservoir valve 136.

Programmatic control of buffer release can provide consistent timing of the lysis step. The buffer 130 can be released rapidly and can fill the removable electrophoresis cell 120 in less than about 1 second. In some instances, the buffer 130 can fill the removable electrophoresis cell 120 in less than about 0.5 seconds. In some instances, the buffer 130 can fill the removable electrophoresis cell 120 in less than about 0.1 seconds. The instrument 100 can include one or more active pumps. The instrument 100 can utilize gravity release to fill the reservoir 135 with buffer 130. The reservoir 135 can be configured to contain a single aliquot of buffer 130. In some instances, the entire volume of a single aliquot of buffer 130 can be released when the valve 136 is opened. In some instances, the reservoir 135 can contain larger volumes of buffer 130, and a subvolume of the larger volume can be released for one assay. The release of a subvolume of buffer 130 can be controlled by the instrument 100. In some instances, the instrument 100 can comprise multiple reservoirs and/or the buffer 130 can be introduced into the removable electrophoresis cell 120 at multiple locations.

Figure 7A:
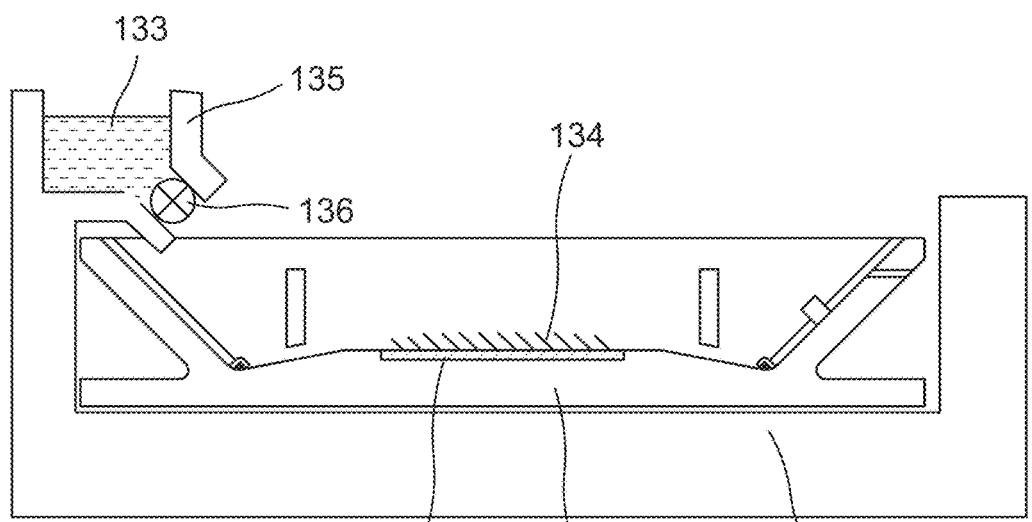
Figure 7B:
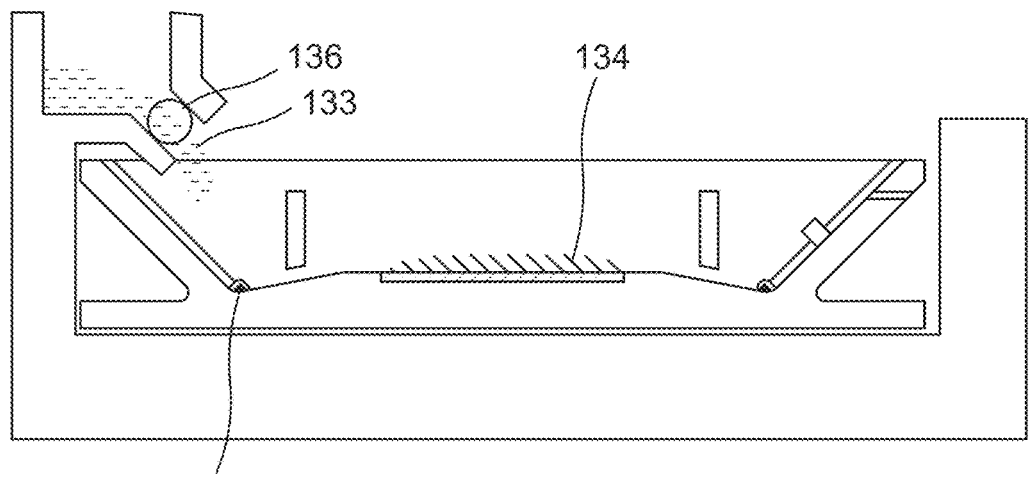
Figure 7C:
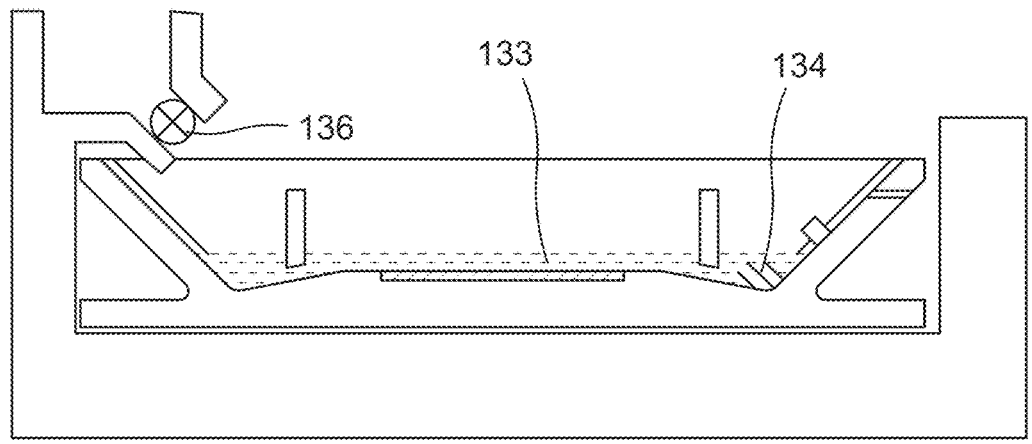

Many lysis buffers can contain high concentrations of surfactants and salts. These additives can assist in cell lysis. However, such additives can also increase the conductivity of the buffer making such buffers less suitable for electrophoresis as excessive electrical current can lead to joule heating and loss of separation resolution. The dual-purpose electrophoresis/lysis buffer 130 can therefore strike a balance between low conductivity for electrophoresis and the ability to lyse cells. In some instances, separately-optimized electrophoresis and lysis buffers can be used. For example, FIGS. 7A-7C show a scWB assay using a separate electrophoresis buffer 133 and lysis buffer 134. Approximately 1 mL of lysis buffer 134 can be added directly to the top surface of a chip, such as the disposable chip 140, to initiate lysis (FIG. 7A). After a lysis time (such as between about 5 to about 15 seconds), a volume (such as about 15 mL) of electrophoresis buffer 133 can be released from a reservoir 135, as in FIG. 7B. The electrophoresis buffer 133 can wash over the surface of the chip 140 and can displace the lysis buffer 134 and can wash it to the side of the removable electrophoresis cell 120 (FIG. 7C) where it can be diluted by the larger volume of electrophoresis buffer 133. This dilution can significantly mitigate the impact of the higher conductivity lysis buffer 134 during electrophoresis. In addition, the electrical resistance of the removable electrophoresis cell 120 can be largely determined by the thin layer of fluid directly above the chip 140 (defining the liquid height 131), therefore removing the lysis buffer 134 from the region above the chip 140 can greatly reduce the current during electrophoresis, independent of effect of dilution. A holding area below the electrode 128 can be created such that the lysis buffer 134 washes into the holding region thereby removing it from the electrical circuit entirely.

Figure 8A:
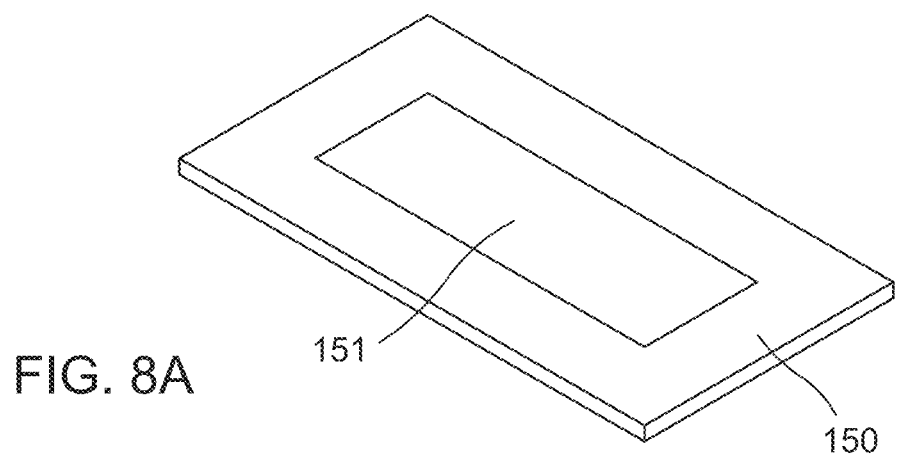
FIGS. 8A-8C illustrate a device for performing antibody probing of a removable chip according to an embodiment.
Figure 8B:
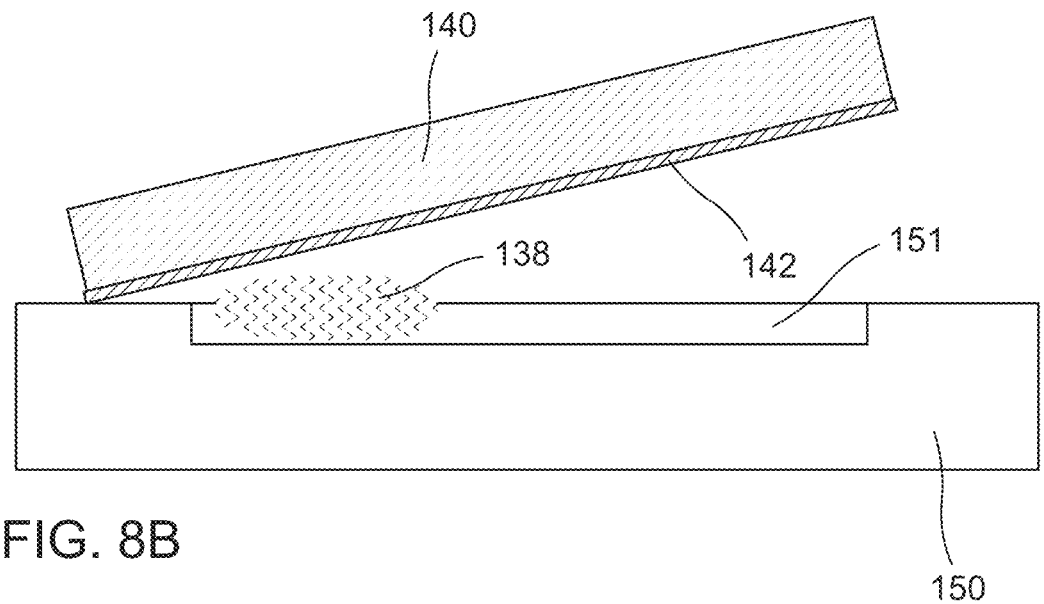
Figure 8C:
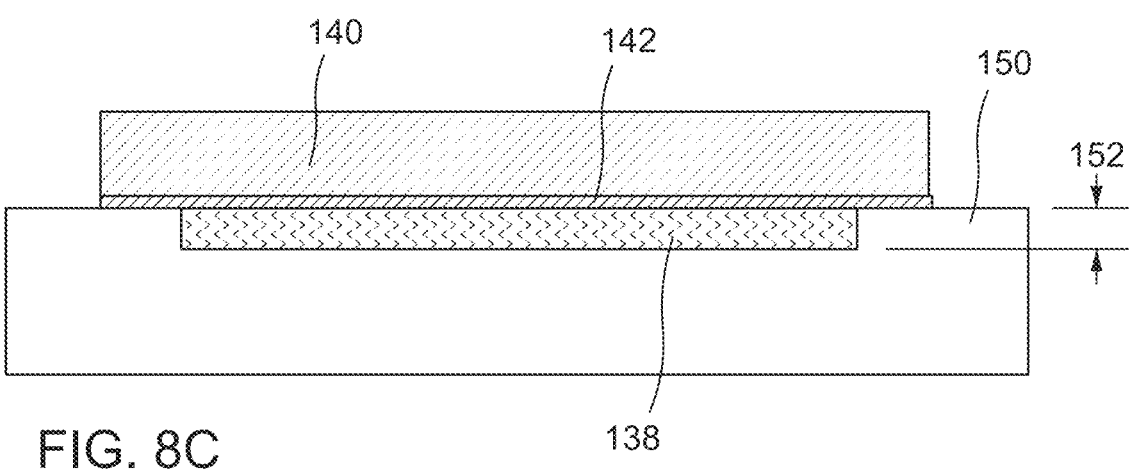

The system can also include tools and fixtures for conducting a scWB assay. FIGS. 8A-8C depict a device and method for performing antibody probing using a chip, which may be the scWB chip 140. The chip 140 may be consumable. In some cases, the chip 140 is disposable or reusable. To ensure uniform antibody staining and facilitate the recovery and reuse of primary antibodies, the device can comprise an incubation chamber, such as an antibody probing fixture 150. The probing fixture 150 can contain a rectangular region with a defined depth or recession 151 with a length and width slightly smaller than the chip 140, as in FIG. 8A. During the antibody probing step, the gel layer 142 containing immobilized proteins (see FIG. 1) can be exposed to a uniform concentration of detection antibodies, such as a) labeled primary antibodies or b) unlabeled primary antibodies followed by incubation with labeled secondary antibodies. A non-uniform gap size 152 may create a non-uniform concentration of antibody across the chip 140 during the incubation. The antibody fixtures can ensure a uniform gap that can be filled with antibody solution 138. The fixture 150 can be constructed of a hydrophobic material (such as PTFE) or can incorporate a hydrophobic coating such that the antibody solution cannot spread out from underneath the more hydrophilic gel layer 142. Keeping the antibody solution 138 contained under the chip 140 can reduce evaporation of the antibody solution 138.

Loading of the fixture is shown in FIG. 8B. A small volume of antibody solution 138 can be placed on the surface of the fixture. In some instances, the small volume can be less than about 100 microliters. The chip 140 with gel layer 142 facing down, can then be rotated onto the fixture 150 as shown in FIG. 8B. Once the chip 140 has been lowered onto the fixture 150, the gap between the gel layer 142 and the bottom of the rectangular depression (recession) 151 can be filled with antibody solution 138. In some instances, the gap size 152 can be about 50 microns or less. Once in place, the scWB consumable chip 140 can be allowed to incubate with the antibody solution 138 (see e.g., FIG. 8C). In some instances, the incubation is for about 30 to about 120 minutes. Extended incubation periods can be possible. Incubations may occur at reduced temperatures. During this incubation period, the entire fixture 150 may be covered to reduce evaporative losses. A small portion of wet cloth or paper may also be placed adjacent to the fixture 150 so as to further limit evaporative losses. At the end of the incubation step, the chip 140 can be removed from the fixture 150 by rotating the chip 140 away from the rectangular depression 151. In addition to helping to contain the antibody solution 138 under the chip 140 during incubation, a hydrophobic fixture can facilitate recovery of the used antibody solution 138 as the solution can tend to reform into a contiguous droplet when the chip 140 is rotated away from the fixture 150. Primary antibody solutions 138 may therefore be reused several times to reduce cost.

Figure 9:
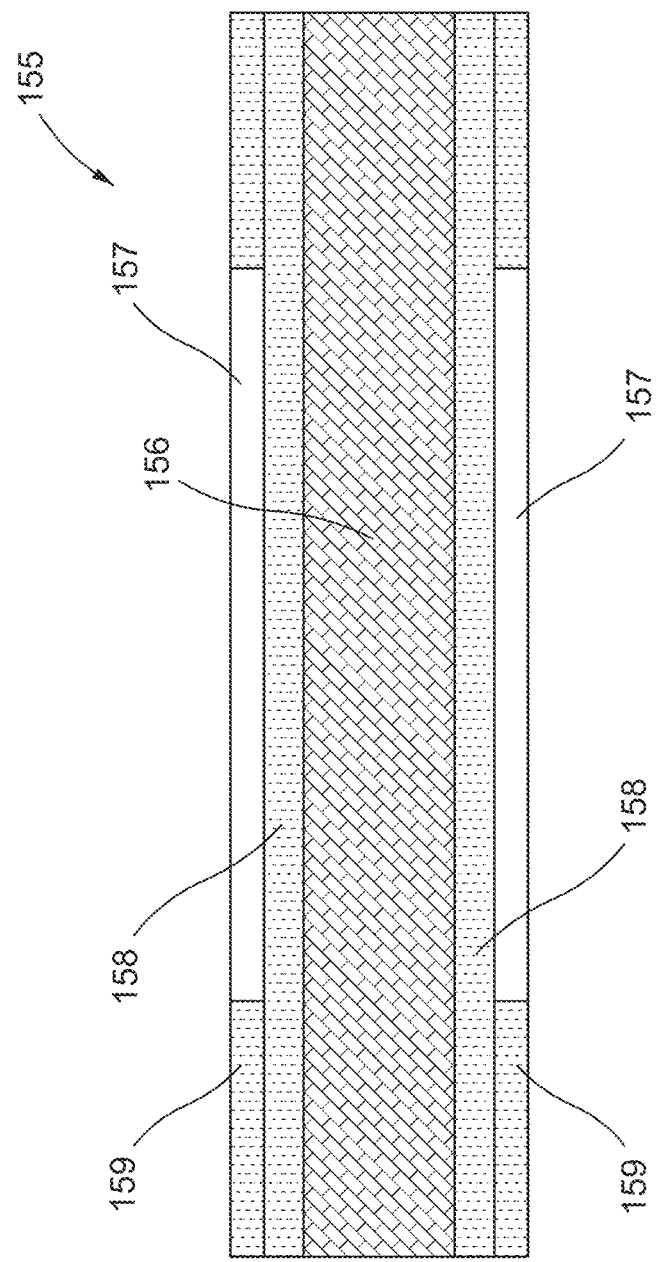
FIG. 9 illustrates a cross-sectional view of an alternate construction for an antibody incubation fixture according to an embodiment.

The fixture 150 shown in FIGS. 8A-8C may be constructed using many common techniques such as machining, injection molding, or hot or cold embossing. FIG. 9 depicts a cross-sectional view of one construction for an antibody incubation fixture 155. In this example construction, a rectangular gap 157 can be formed on both sides of the fixture 155 using laminated layers. The core 156 of the fixture 155 may be constructed of any suitable, flat material such as for example, 0.125 inch thick poly(methyl methacrylate) (PMMA). Thin hydrophobic layers 158, such as 0.001 inch thick PTFE layers are then attached to the core layer 156. Finally, an additional hydrophobic layer having a rectangular region 159 removed can be attached to the first hydrophobic layer 158. The advantage of using laminated layers to define the gap size is that the laminated layers can be very flat over distances comparable to the size of the chip. The gap size of such a laminated device can be very uniform and can be defined by the thickness of the layer. The layers may be attached to each other using many techniques known to one skilled in the art, such as thermal bonding, solvent bonding, or use of intermediate pressure-sensitive adhesive layers.

As described with reference to FIG. 1, the first step of the scWB assay can be to settle cells into the array of the microwells formed into the gel layer 142. Once the cells are settled into wells, the user can gently rinse the chip 140 to remove cells that have not settled into wells substantially without washing cells out of microwells. FIG. 10 depicts another fixture 160 included with the system that can aid in rinsing of the chip 140 after cell settling. The rinsing fixture 160 can place the chip 140 at a shallow angle 161 which has a typical value of approximately 15 degrees. In other embodiments, the angle 161 can be greater than 15 degrees or less than 15 degrees. Wash buffer 139 can be ejected slowly from a pipette tip 162. The angle 161 of the rinsing fixture 160 can allow the wash buffer 139 to flow across the gel layer 142 at a controlled velocity thereby minimizing perturbation of cells that are trapped inside microwells while rinsing away cells that remain on the surface of the gel layer 142.

The present disclosure also provides methods for obtaining molecular weight sizing of endogenous proteins contained in the cells. Separately optimized lysis and electrophoresis buffers can allow for the convenient introduction of protein standards. Preferential partitioning of proteins to open wells versus gel can allow for facile loading of protein markers that separate with the expected linear log molecular weight (MW) vs. mobility relationship. Thus, it may be not necessary to load distinct sub-nanoliter volumes of protein marker solutions into the thousands of microwells contained within the chip. Protein markers can be fluorescently tagged using a distinct wavelength such that they do not interfere with later detection of endogenous proteins. The protein markers can be tagged with a cleavable or quenchable fluorophore which can be detected and then removed or quenched prior to detection of endogenous proteins. Using the two-buffer method described with reference to FIGS. 7A-7C, one can add protein markers to the lysis buffer such that they can be introduced simultaneously as cell lysis occurs. Alternately, protein markers can be loaded into lysosomes or agarose (or other polymer) beads. The lysosomes and beads can then be settled simultaneously along with the cells resulting in some microwells containing marker proteins. Proteins can leave the lysosomes or beads when an external electric field is supplied to commence electrophoresis. An AC electric field can be applied to release the protein markers in a manner similar to electroporation of cells. The lysis buffer can be modified to release the protein markers from the lysosomes or beads.

Protein sizing standards can be spotted onto a chip at various locations during manufacturing and rehydrated during use of the chip. Separate regions on a chip, such as alternating separate regions, may be designated for protein sizing ladders where the wells for the sizing ladders can be increased in at least one dimension to allow for more convenient loading of sizing markers.

Another aspect of the present disclosure allows for the introduction of fluorescence standards such that detected endogenous proteins can be compared to a known fluorescence signal and measurements can more readily be compared between chips. In an example, the fluorescence standard can be introduced into the chip at discreet locations during manufacturing. Standards can be, for example, incorporated throughout the gel, or can be spotted onto regions of the chip before cross-linking of the gel has completed, or the reactive groups within the gel (e.g., benzophenone) may be activated to covalently bind the fluorescence standards. Fluorescence standards can be introduced in beads which co-settle into the wells along with cells. The beads can remain in the wells and the fluorescence signal from these beads can be compared to the signal from labeled, endogenous proteins that separate away from the wells. The beads can be commercially available silica beads (or the like), or they may be beads formed from a hydrogel. An example of a hydrogel bead includes polyacrylamide beads containing a benzophenone-methacrylamide co-monomer. Fluorescent dyes can be incorporated into the polyacrylamide bead by incubation with a desired dye followed by photo-initiated binding of the dye to benzophenone functional group incorporated into the hydrogel bead. Polyacrylamide beads can allow a user to conveniently add a desired marker to the beads. Beads can also incorporate magnetic nanoparticles to assist in manipulation of the beads.

The present disclosure provides computer control systems that are programmed to implement methods of the disclosure. FIG. 11 shows a computer system 170 that is programmed or otherwise configured to implement systems and methods provided herein. The computer system 170 can regulate various aspects of analyte detection of the present disclosure, such as, for example, automated single cell western blogging. The computer system 170 can be an electronic device of a user or a computer system that is remotely located with respect to the electronic device. The electronic device can be a mobile electronic device.

The computer system 170 includes a central processing unit (CPU, also "processor" and "computer processor" herein) 171, which can be a single core or multi core processor, or a plurality of processors for parallel processing. The computer system 170 also includes memory or memory location 172 (e.g., random-access memory, read-only memory, flash memory), electronic storage unit 173 (e.g., hard disk), communication interface 174 (e.g., network adapter) for communicating with one or more other systems, and peripheral devices 175, such as cache, other memory, data storage and/or electronic display adapters. The memory 172, storage unit 173, interface 174, and peripheral devices 175 are in communication with the CPU 171 through a communication bus (solid lines), such as a motherboard. The storage unit 173 can be a data storage unit (or data repository) for storing data. The computer system 170 can be operatively coupled to a computer network ("network") 176 with the aid of the communication interface 174 via a wired or wireless connection. The network 176 can be the Internet, an internet and/or extranet, or an intranet and/or extranet that is in communication with the Internet. The network 176 in some cases is a telecommunication and/or data network. The network 176 can include one or more computer servers, which can enable distributed computing, such as cloud computing. The network 176, in some cases with the aid of the computer system 170, can implement a peer-to-peer network, which may enable devices coupled to the computer system 170 to behave as a client or a server.

The CPU 171 can execute a sequence of machine-readable instructions, which can be embodied in a program or software. The instructions may be stored in a memory location, such as the memory 172. The instructions can be directed to the CPU 171, which can subsequently program or otherwise configure the CPU 171 to implement methods of the present disclosure. Examples of operations performed by the CPU 171 can include fetch, decode, execute, and writeback, and/or any other suitable operation.

The CPU 171 can be part of a circuit, such as an integrated circuit. One or more other components of the computer system 170 can be included in the circuit. In some cases, the circuit is an application specific integrated circuit (ASIC). In some embodiments, the CPU 171 and/or integrated circuit can include and/or can execute one or more modules associated with controlling the systems described herein. As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an ASIC, a digital signal processor (DSP)) and/or software-based module (e.g., a module of computer code stored in memory and/or executed at the processor) capable of performing one or more specific functions associated with that module.

The storage unit 173 can store files, such as drivers, libraries, profiles, saved programs, etc. The storage unit 173 can store user data, e.g., user preferences and user programs. The computer system 170 in some cases can include one or more additional data storage units that are external to the computer system 170, such as located on a remote server that is in communication with the computer system 170 through an intranet or the Internet (e.g., network attached storage (NAS) device).

The computer system 170 can communicate with one or more remote computer systems through the network 176. For instance, the computer system 170 can communicate with a remote computer system of a user (e.g., service provider). Examples of remote computer systems include servers, host devices, personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 170 via the network 176.

Methods as described herein can be implemented by way of machine (e.g., computer processor) executable code stored on an electronic storage location of the computer system 170, such as, for example, on the memory 172 or electronic storage unit 173. The machine executable or machine readable code can be provided in the form of software. During use, the code can be executed by the processor 171. In some cases, the code can be retrieved from the storage unit 173 and stored on the memory 172 for ready access by the processor 171. In some situations, the electronic storage unit 173 can be precluded, and machine-executable instructions are stored on memory 172.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 170, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wires, and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a compact disc-read only memory (CD-ROM), digital video disc (DVD) or digital video disc-read only memory DVD-ROM, any other optical medium, punch cards paper tape, any other physical storage medium with patterns of holes, a random-access memory (RAM), a read-only memory (ROM), a programmable read-only memory (PROM) and erasable programmable read-only memory (EPROM), a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 170 can include or be in communication with an electronic display 177 that comprises a user interface (UI) 178 for providing, for example, an output or readout of the system coupled to the computer processor. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 171. The algorithm can, for example, be used to analyze results, such as the presence of one or more target analytes in a biological sample. A final data set can be constructed based on portions of data gathered from each assay of each biological sample.

Figure 12A:
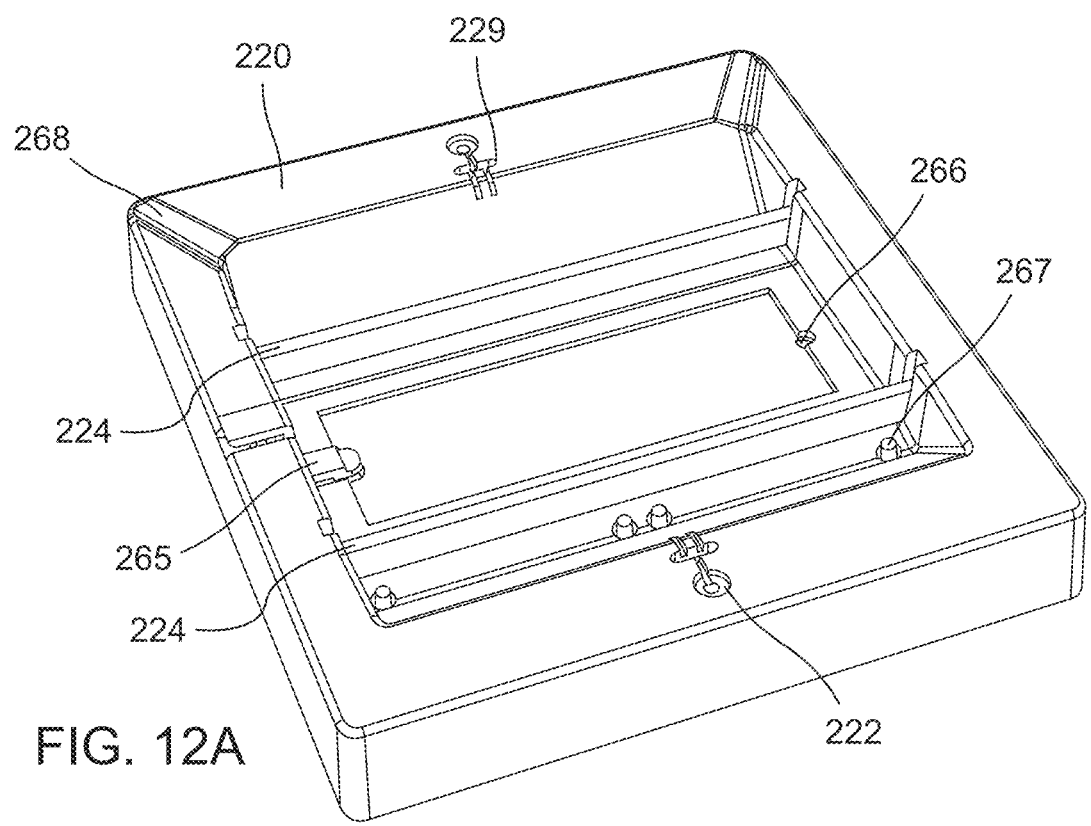
FIGS. 12A and 12B illustrate a removable electrophoresis cell according to an embodiment.
Figure 12B:
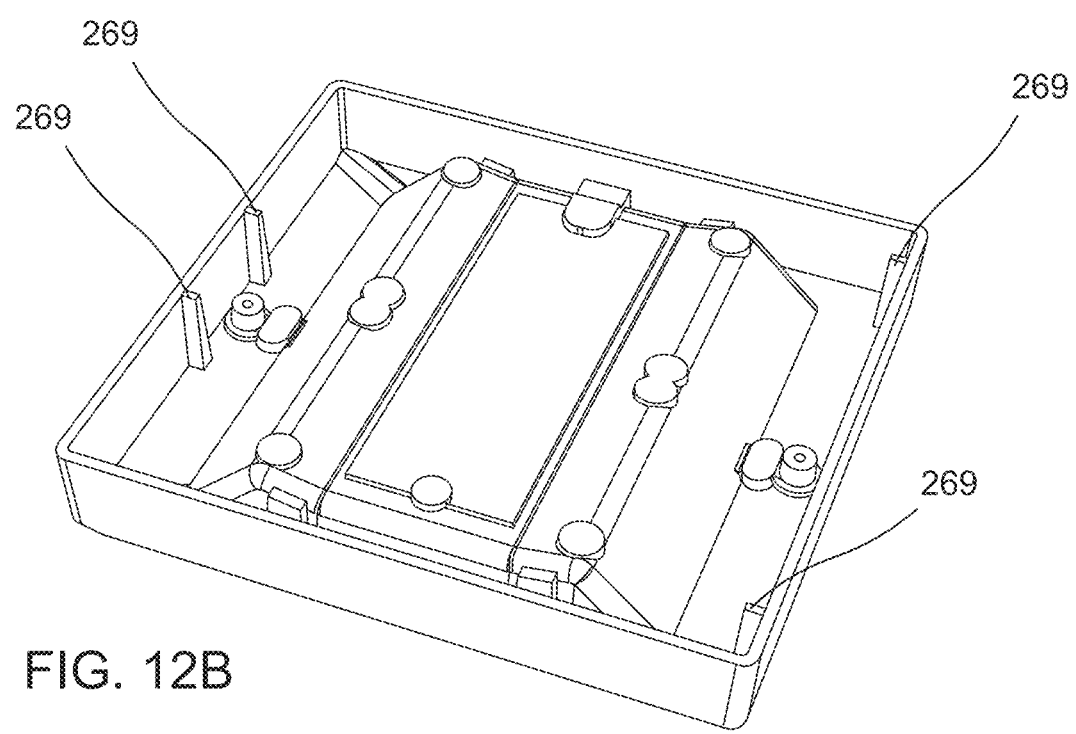

While the removable electrophoresis cell 120 is particularly described above with reference to FIGS. 2-9, in other embodiment, a scWB instrument such as the instrument 100 can be configured to receive and/or otherwise use any suitable electrophoresis cell. For example, FIGS. 12A and 12B illustrate a removable electrophoresis cell 220 according to an embodiment. In some embodiments, the removable electrophoresis cell 220 has been designed and/or otherwise optimized for manufacturing by injection molding. Portions of the removable electrophoresis cell 220 can be similar in form and/or function to corresponding portions and/or features of the electrophoresis cell 120 described above with reference to FIGS. 2-9 and thus, such portions are not described in further detail herein.

As shown, the removable electrophoresis cell 220 includes wicking breaks 229 to prevent fluid from wicking up the electrodes to one or more contact pad areas 222. The electrophoresis cell 220 also includes an integrated chip lifter 265 that facilitates removal of a chip (e.g., the chip 140) from the cell 220. In the embodiment shown in FIGS. 12A and 12B, when the chip lifter 265 is in the down position, it fits flush with the electrophoresis body so as to prevent trapping of air bubbles as well as electric field perturbations that can be caused by changes in fluid height near the edge of the chip (as described in detail above with reference to the electrophoresis cell 120). The electrophoresis cell 220 includes weirs 224 that are inserted separately, allowing for the electrophoresis cell 220 to be molded. To attach the electrode wire (not shown), heat staking features 267 are included. The wire can be stretched between the heat staking features 267 which are then melted to permanently hold the wire in place. A small (<3 mm) circular recess 266 allows an alternate way of removing the chip from the electrophoresis cell 220 by using a pointed prying tool. The small size of the recess 266 minimizes bubble trapping and electric field perturbations. As shown in FIG. 12B, the underside of the electrophoresis cell 220 includes stabilization posts 269 which force the electrophoresis cell 220 to contact the receptacle in an instrument (e.g., the instrument 100) at fixed points. As shown, the electrophoresis cell 220 includes spout features 268 that can assist in pouring used buffer from the electrophoresis cell after use. In this manner, the electrophoresis cell 220 can be used in any suitable scWB process and/or procedure such as any of those described herein.

Examples

An integrated opto-electronic instrument has been built that accurately controls all timed steps and provides uniform, repeatable, safe application of electric field and UV illumination for execution of the scWB assay. The integrated instrument minimizes the time between separation and UV photocapture, thus limiting diffusive dispersion and loss of separation resolution. For safe deployment to external users, mechanical interlocking of the high voltage and UV light has been implemented. Below, details on the optimized system components and demonstrate safe operation and acceptable assay performance of the integrated prototype are presented.

Removable Electrophoresis Cell.

Iterative prototyping and design processes were employed to build, test, and optimize a removable electrophoresis cell for use in the final integrated scWB device. The design of the removable electrophoresis cell was configured to, for example, reduce electrolysis bubble formation near the electrodes that spread to cover the liquid surface within the cell, perturbing the electric field and blocking a portion of the UV light during the subsequent UV exposure step. Further, the design was configured to, for example, increase reliable chip adhesion and repeatable buffer addition.

In some embodiments, a chip recess can include finger cut-outs for facile chip removal. Such a chip recess can be sufficiently deep to protect the chip from being dislodged during buffer addition obviating the need for a petroleum jelly fixative. Further, bubble trapping weir structures can be used to separate the platinum electrodes from the main cell compartment and prevent bubbles from floating over the chip surface. In some instances, however, such finger cutouts can lead to, for example, electric field distortion observed at the edges of the chip (8° near edge vs. <2° near center). Numerical simulations confirm that, in some instances, this non-uniformity can be caused by liquid (e.g., buffer solution) height discontinuities due to finger cutouts and the chip not being flush with the bottom surface of the cell. Changes in the liquid height at the edge of the chip can cause the electric field lines to diverge, leading to electric field distortion near the edges of the chip.

Figure 13:
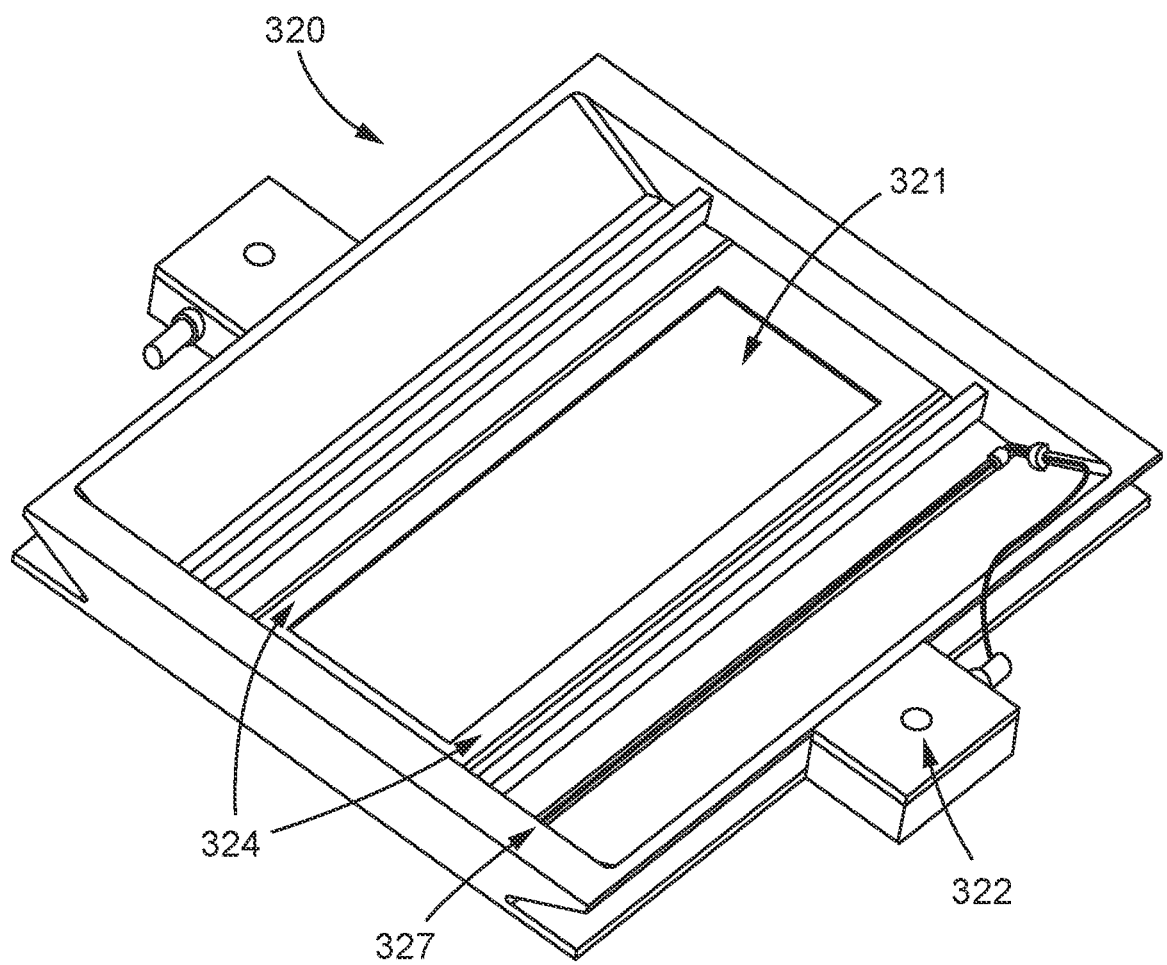
FIG. 13 illustrates a removable electrophoresis cell according to an embodiment.

To increase field uniformity, changes in the liquid height were avoided. For example, in some embodiments, a removable electrophoresis cell 320 includes a chip recess 321 configured to fully recess the chip such that the gel layer protruded beyond the chip recess 321 and finger cut-outs were removed (see FIG. 13) Such a removable electrophoresis cell 320 can incorporate the following designs: 1) A relatively large buffer reservoir allowing for the addition of lysis/electrophoresis buffer without spilling, 2) bubble traps (e.g., weirs 324) to prevent electrolysis bubbles from migrating over the surface of the chip and blocking UV light during photocapture while further damping fluid motion above the chip, 3) pogo-pin high-voltage contacts for integration with the instrument lid, and 4) the chip recess 321 without finger cutouts to minimize field distortion near the edges of the chip. The removable electrophoresis cell 300 can also include electrical contact pads 322 and a platinum electrode 327, as described above.

Light Source Selection.

Several candidate light sources were tested. Benzophenone capture chemistries are known to be activated in the range of 330-360 nanometers (nm) and the Lightning cure lamp has a broad spectrum output with significant power at 316 nm and 365 nm. Several compact light sources in the 310 to 365 nm wavelength range were evaluated. No capture was observed under high power (1200 microWatts (mW)/cm$^2$) 365 nm LEDs (Hamamatsu). Compact UV fluorescent tube lamps were obtained from UV Systems (Renton, Wash.) and the performance of bulbs was compared with broad outputs centered at 365 nm and 312 nm, respectively. Both bulbs have significant power output in the 330-360 nm range. The 312 nm wavelength bulb yielded a significant increase in capture efficiency compared to a 365 nm bulb (69% vs. 10% for a 4 minute exposure). Reducing the exposure time on the 312 nm bulb to 1 min yielded a measured mean capture efficiency of 52% (compared to 69% for a 4 min exposure time) suggesting that the exposure time can be reduced from 4 minutes with a moderate reduction in the capture efficiency.

Integrated Prototype.

Figure 14A:
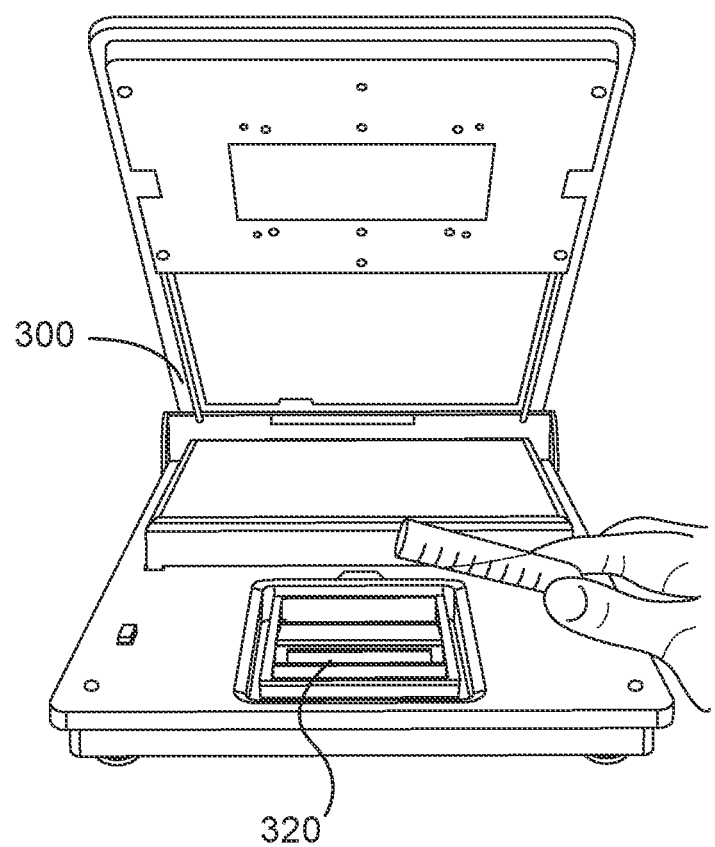
FIG. 14A illustrates a scWB apparatus with an open lid showing the removable electrophoresis cell according to an embodiment.
Figure 14B:
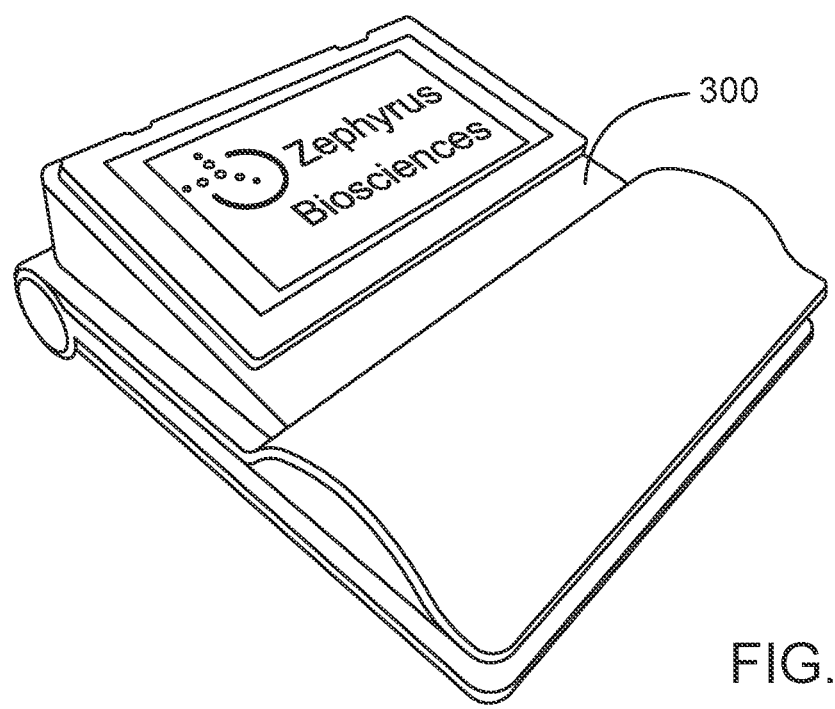
FIGS. 14B and 14C illustrate an exterior view of the scWB apparatus of FIG. 14A showing a touchscreen feature.
Figure 14C:
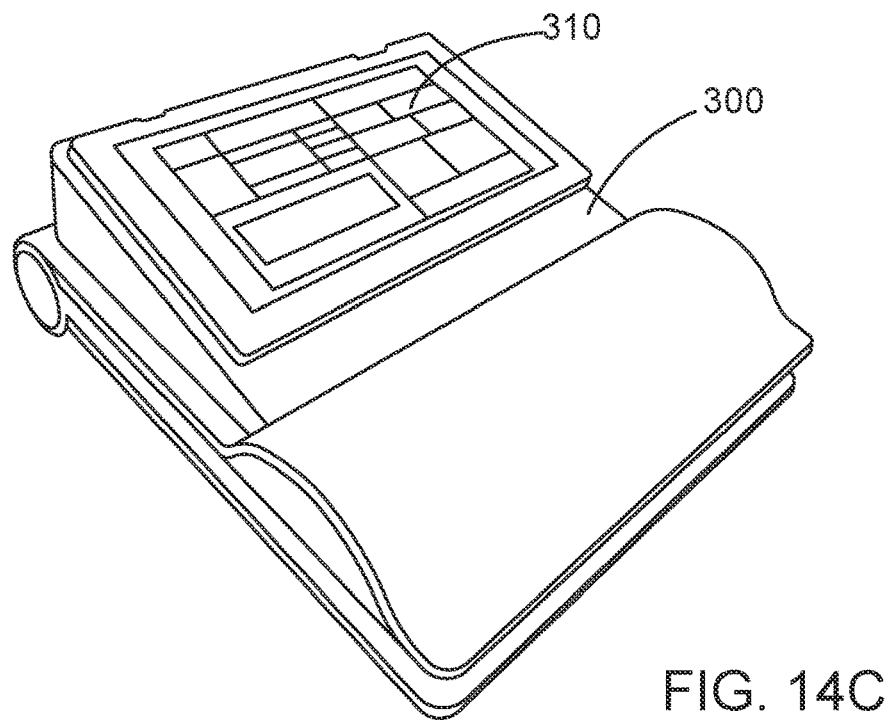
Figure 14D:
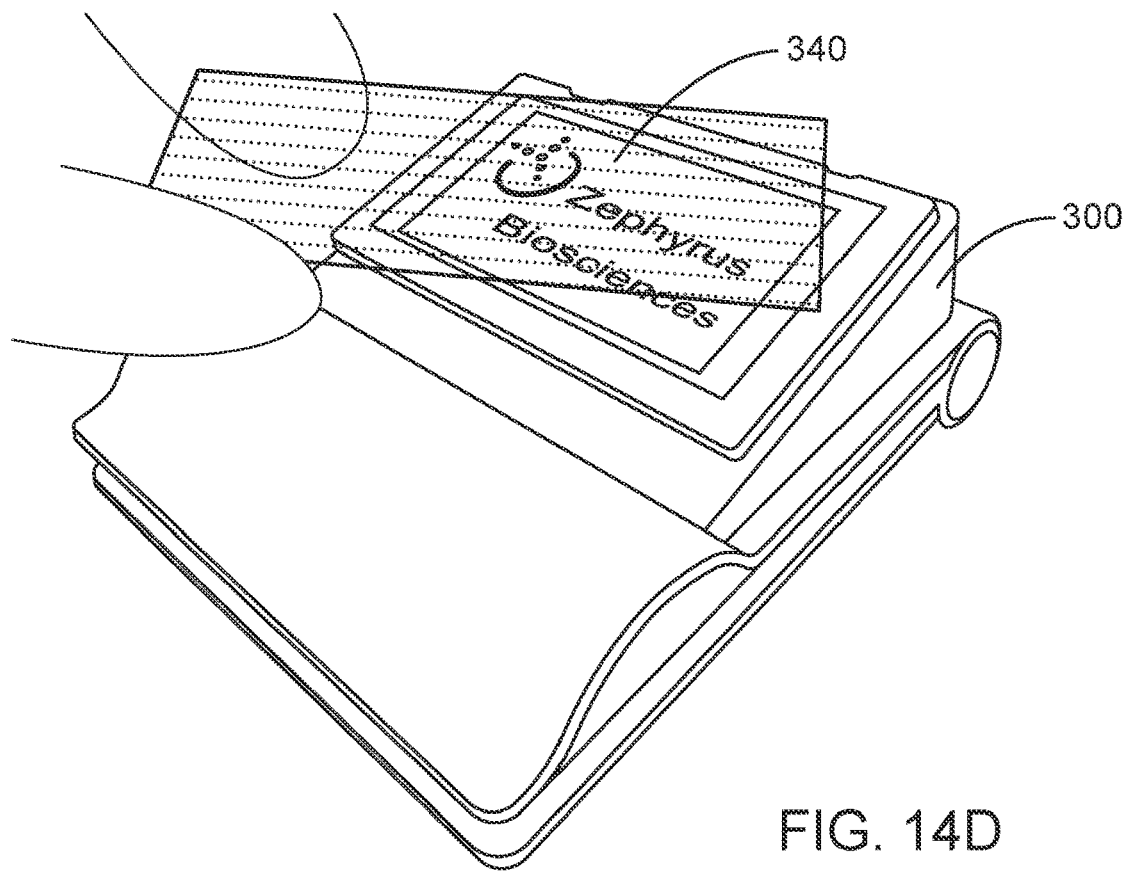
FIG. 14D illustrates a scWB removable chip configured for use with the scWB apparatus of FIG. 14A.

An integrated high-voltage electrophoresis and UV exposure unit is used to accurately control all timed steps and provide uniform, repeatable, safe application of electric fields and UV illumination. An integrated opto-electronic instrument 300 was built that incorporates the custom-designed removable electrophoresis cell 320, a chip 340 (such as those described above), and a 312 nm UV bulb from UV Systems to enable safe and automated sequential operation of electrophoresis and UV exposure steps (see e.g., FIGS. 14A-14D). A touchscreen 310 with a graphical user interface was developed to allow users to have control over key assay steps: lysis time, electrophoresis run time, voltage, and UV exposure time (FIGS. 14B and 14C).

Safety interlocking features were successfully incorporated and the UV light was visually observed to cease upon opening of the lid. The electrical current was measured with a multimeter and found to cease upon opening the lid. The instrument was additionally fitted with a drain circuit to drain any residual charge from the high voltage pin when the lid is opened. Light-blocking features were incorporated to limit any leakage of UV light to negligible levels.

Methods and Analysis:

The ability to lyse cells settled in a scWB chip by covering the chip with ~1 mL of lysis buffer for 10-15 seconds and then quickly replacing the lysis buffer with electrophoresis buffer was demonstrated. Loss of lysed proteins inside the microwells can be minimized by rapidly replacing the buffer above the chip without excessive fluid perturbation using the removable electrophoresis cell and instrumentation described with reference to FIG. 4, FIGS. 5A and 5B, and FIGS. 7A-7C.

Figure 16A:
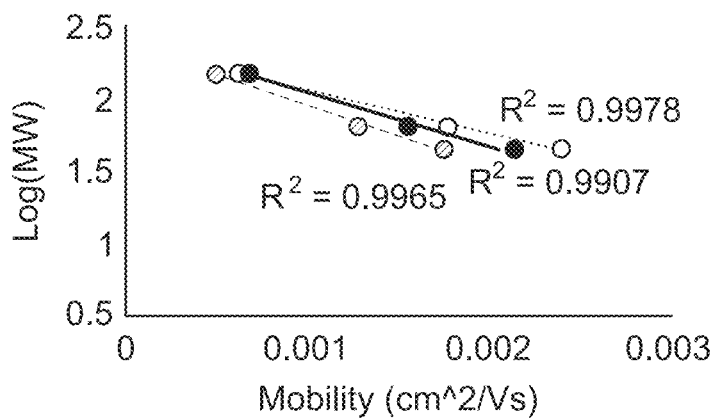
FIGS. 16A-16C illustrate molecular weight sizing on 8% T gel, 10% T gel, and 12% T gel, respectively.
Figure 16B:
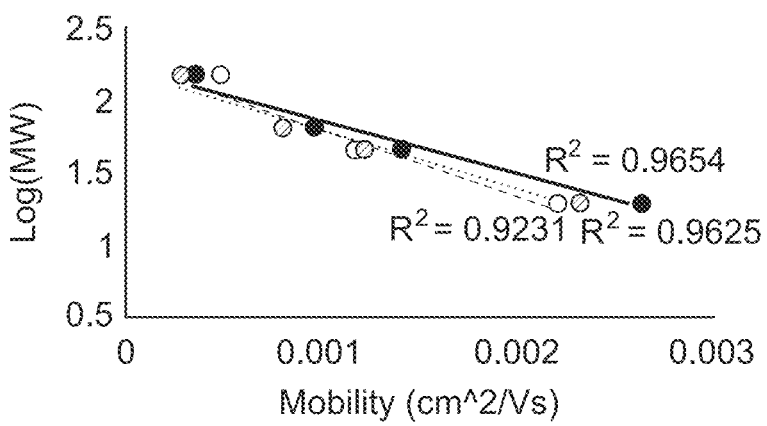
Figure 16C:
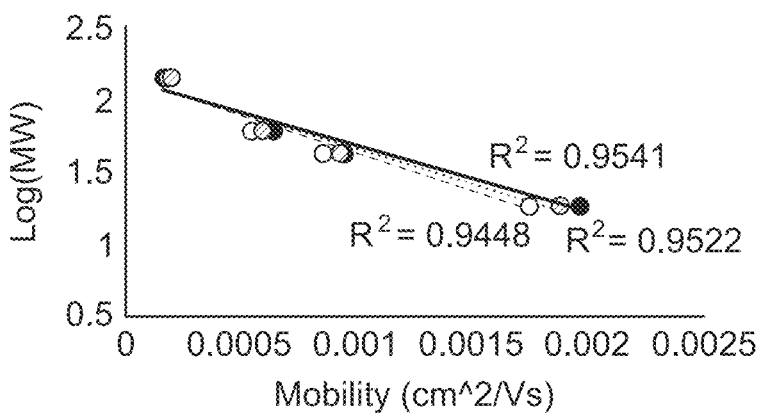

Preferential partitioning of proteins to open wells versus gel allows for facile loading of protein markers that separate with the expected linear log MW vs. mobility relationship (see FIGS. 16A-16C).

Figure 15C:
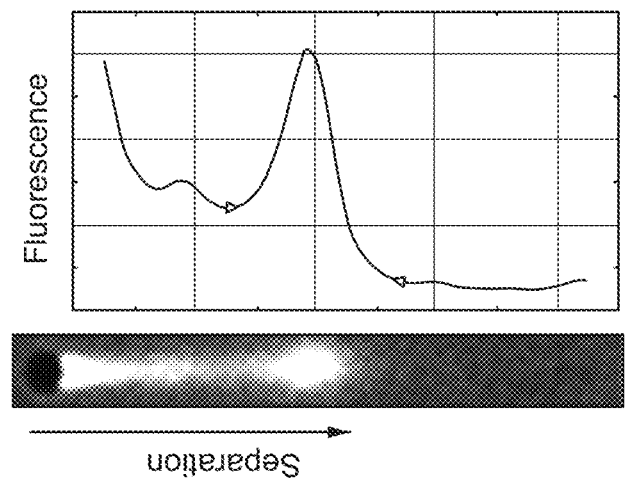
FIGS. 15A-15C illustrate fluorescence measurements relative to protein separation of beta-tubulin in CHO cells performing a scWB assay via, for example, the scWB apparatus of FIGS. 14A-14D.
Figure 15B:
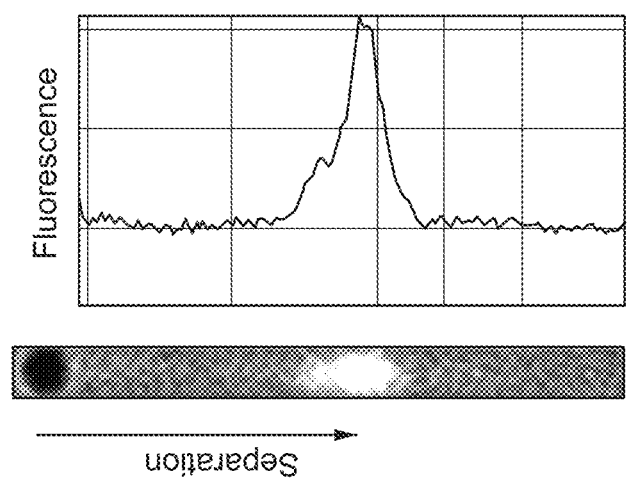
Figure 15A:
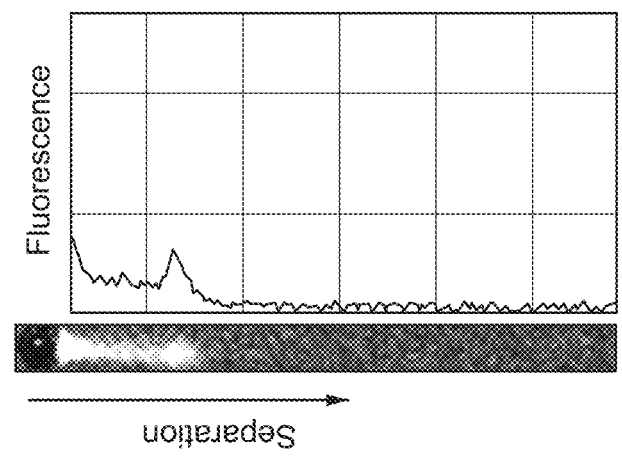

Once incubated with the chip, the marker-containing buffer was removed to avoid continuous injection and reduced resolution of the protein markers during separation. Using the two-buffer workflow (see, e.g., FIG. 7), the ability to introduce molecular weight sizing protein markers in the lysis buffer has been shown. Surface tension holds the marker-containing lysis buffer on the surface of the gel, filling the wells, until the electrophoresis buffer is introduced and flows over the chip. Separate from the need to avoid continuous injection, introduction of the protein markers in the smaller volume of lysis buffer (versus the electrophoresis buffer) reduces the required mass (and cost) of ladder proteins by an order of magnitude. Preliminary results for sizing of endogenous beta-tubulin in a Chinese hamster ovary (CHO) cell line using ovalbumin and immunoglobulin G (IgG) markers reduced variability from field perturbations across the chip (raw migration distance had a 7.9% CV while a sizing correction using ovalbumin and IgG reduced the CV to 3.4%) (see e.g., FIGS. 15A-15C, illustrating a relationship between an amount of measured fluorescence and an amount of protein separation). FIGS. 16A-16C illustrate molecular weight sizing on 8% T gel, 10% T gel, and 12% T gel, respectively.

As described above, some embodiments herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as CDs, DVDs, CD-ROMs, and holographic devices; magneto-optical storage media such as optical disks; carrier wave signal processing modules; and hardware devices that are specially configured to store and execute program code, such as ASICs, Programmable Logic Devices (PLDs), Read-Only Memory (ROM), and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an ASIC. Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed:

1. An electrophoresis cell configured to be removably disposed within a receptacle of an assay device to assay a biological sample for a presence of a target analyte, the electrophoresis cell comprising:
    a body having an inner surface that defines an inner volume and that forms a recess area;
    a chip disposed within the recess area, the chip including a polymeric separation medium with functional groups configured to covalently bond to a target analyte within the biological sample disposed on the chip in response to being activated, a top surface of the polymeric separation medium being substantially flush with a non-recessed area of the inner surface of the body;
    a conductive contact pad coupled to the body, the conductive contact pad configured to be electrically connected to a power supply of the assay device when the electrophoresis cell is disposed within the receptacle;
    an electrode coupled to the body and disposed within the inner volume, the electrode electrically connected to the conductive contact pad, the electrode configured to produce an electric field across the chip disposed in the recess area in response to a flow of electric current from the power supply when the electrophoresis cell is disposed within the receptacle; and
    a weir structure coupled to the body and disposed within the inner volume of the body above and on at least one side of the recess area such that the weir structure is spaced apart from the electrode and is between the at least one side of the recess area and the electrode, the weir structure configured to control a flow of a solution across the chip disposed in the recess area.

2. The electrophoresis cell of claim 1, wherein the electrode is a first electrode and the conductive contact pad is a first conductive contact pad, the electrophoresis cell further comprising:
    a second electrode disposed within the inner volume of the body and electrically connected to a second conductive contact pad electrically connected to the power supply when the electrophoresis cell is disposed within the receptacle, the first electrode disposed on a first side of the recess area, the second electrode disposed on a second side of the recess area.

3. The electrophoresis cell of claim 1, wherein the chip is consumable.

4. The electrophoresis cell of claim 1, wherein the polymeric separation medium includes a plurality of microwells formed therein.

5. The electrophoresis cell of claim 4, wherein each microwell from the plurality of microwells is configured to accommodate a single cell from the biological sample, each microwell from the plurality of microwells having a diameter of less than about 100 microns.

6. The electrophoresis cell of claim 1, wherein the polymeric separation medium is cross-linked.

7. The electrophoresis cell of claim 1, wherein the functional groups are benzophenone groups.

8. The electrophoresis cell of claim 1, wherein the functional groups are activated by electromagnetic radiation within the ultraviolet spectrum.

9. The electrophoresis cell of claim 1, wherein the weir structure is configured to trap bubbles on a top surface of the chip when the electrophoresis cell is within the receptacle.

10. The electrophoresis cell of claim 1, wherein the weir structure is configured to prevent bubbles from floating on a top surface of the chip when the electrophoresis cell is within the receptacle.

11. The electrophoresis cell of claim 1, wherein the weir structure is configured to reduce at least one of perturbation in the electric field, blockage of wavelengths generated by a source of activation energy, and fluid motion of buffer solution when the electrophoresis cell is within the receptacle.

12. The electrophoresis cell of claim 1, wherein the chip includes an identification member, the assay device including a sensor configured to identify the identification member when the electrophoresis cell is inserted into the receptacle.

13. The electrophoresis cell of claim 12, wherein the identification member includes at least one of a one-dimensional identification barcode, a two-dimensional identification barcode, and a radio frequency identification (RFID) unit.

14. The electrophoresis cell of claim 12, wherein the assay device determines a set of assay parameters for the assaying the biological sample in response to the sensor identifying the identification member.

15. The electrophoresis cell of claim 1, wherein the recess area defines a detent configured to facilitate removal of the chip from the recess area.

16. The electrophoresis cell of claim 15, wherein a size of the detent is configured to limit at least one of bubble trapping in the detent or electric field perturbations.

17. The electrophoresis cell of claim 1, wherein the body includes at least one wicking break configured to limit wicking of the solution up the electrode.

18. The electrophoresis cell of claim 1, wherein the weir structure is removably coupled to the body.

19. The electrophoresis cell of claim 1, wherein the weir structure is a first weir structure, the first weir structure is disposed within the inner volume of the body above and on a first side of the recess area, the electrophoresis cell further comprising:
a second weir structure configured to control a flow of the solution across the recess area, the second weir structure is disposed within the inner volume of the body above and on a second side of the recess area.

20. The electrophoresis cell of claim 1, wherein the weir structure is disposed between the at least one side of the recess area and the electrode coupled to the body to prevent bubbles generated by the electrode on a first side of the weir structure from flowing across the chip disposed on a second side of the weir structure opposite the first side when the electrophoresis cell is within the receptacle.

21. The electrophoresis cell of claim 1, wherein the weir structure is disposed between the at least one side of the recess area and the electrode coupled to the body to prevent bubbles resulting from a volume of the solution being poured into the inner volume on a first side of the weir structure from flowing across the chip disposed on a second side of the weir structure opposite the first side when the electrophoresis cell is within the receptacle.

22. An electrophoresis cell configured to be removably disposed within a receptacle of an assay device to assay a biological sample for a presence of a target analyte, the electrophoresis cell comprising:
a body having an inner surface that defines an inner volume and that forms a recess area, the body including a lifter at least partially disposed in the inner volume of the body, the lifter having a first position and a second position, a surface of the lifter being substantially flush with a surface of the recess area when in the first position;
a chip disposed within the recess area, the chip including a polymeric separation medium with functional groups configured to covalently bond to a target analyte within the biological sample disposed on the chip in response to being activated, a top surface of the polymeric separation medium being substantially flush with a non-recess area of the inner surface of the body;
a conductive contact pad coupled to the body, the conductive contact pad configured to be electrically connected to a power supply of the assay device when the electrophoresis cell is disposed within the receptacle;
an electrode coupled to the body and disposed within the inner volume, the electrode electrically connected to the conductive contact pad, the electrode configured to produce an electric field across the chip disposed in the recess area in response to a flow of electric current from the power supply when the electrophoresis cell is disposed within the receptacle; and
a weir structure disposed within the inner volume of the body above and on at least one side of the recess area such that the weir structure is spaced apart from the electrode and is between the at least one side of the recess area and the electrode, the weir structure configured to control a flow of a solution across the chip disposed in the recess area.

23. The electrophoresis cell of claim 22, wherein the surface of the lifter being substantially flush with the surface of the recess area when the lifter is in the first position is configured to limit at least one of bubble trapping or electric field perturbations otherwise resulting from a change in a height of the solution.

24. The electrophoresis cell of claim 22, wherein the surface of the lifter is spaced apart from the surface of the recess area when in the second position to facilitate removal of the chip from the recess area.

25. The electrophoresis cell of claim 22, wherein the lifter is integrated into the body.

26. The electrophoresis cell of claim 22, wherein the recess area defines a detent configured to facilitate removal of the chip from the recess area.

27. The electrophoresis cell of claim 26, wherein a size of the detent is configured to limit at least one of bubble trapping in the detent or electric field perturbations.

28. The electrophoresis cell of claim 22, wherein the body includes at least one wicking break configured to limit wicking of the solution up the electrode.

29. The electrophoresis cell of claim 22, wherein the electrode is a first electrode and the conductive contact pad is a first conductive contact pad, the electrophoresis cell further comprising:
a second electrode disposed within the inner volume of the body and electrically connected to a second conductive contact pad electrically connected to the power supply when the electrophoresis cell is disposed within the receptacle, the first electrode disposed on a first side of the recess area, the second electrode disposed on a second side of the recess area.

30. The electrophoresis cell of claim 22, wherein the chip is consumable.

31. The electrophoresis cell of claim 22, wherein the polymeric separation medium includes a plurality of microwells formed therein.

32. The electrophoresis cell of claim 31, wherein each microwell from the plurality of microwells is configured to accommodate a single cell from the biological sample, each microwell from the plurality of microwells having a diameter of less than about 100 microns.

33. The electrophoresis cell of claim 22, wherein the polymeric separation medium is cross-linked.

34. The electrophoresis cell of claim 22, wherein the functional groups are benzophenone groups.

35. The electrophoresis cell of claim 22, wherein the functional groups are activated by electromagnetic radiation within the ultraviolet spectrum.

36. The electrophoresis cell of claim 22, wherein the weir structure is configured to trap bubbles on a top surface of the chip when the electrophoresis cell is within the receptacle.

37. The electrophoresis cell of claim 22, wherein the weir structure is configured to prevent bubbles from floating on a top surface of the chip when the electrophoresis cell is within the receptacle.

38. The electrophoresis cell of claim 22, wherein the weir structure is configured to reduce at least one of perturbation in the electric field, blockage of wavelengths generated by a source of activation energy, and fluid motion of buffer solution when the electrophoresis cell is within the receptacle.

39. The electrophoresis cell of claim 22, wherein the weir structure is removably coupled to the body.

40. The electrophoresis cell of claim 22, wherein the weir structure is a first weir structure, the first weir structure is disposed within the inner volume of the body above and on a first side of the recess area, the electrophoresis cell further comprising:
    a second weir structure configured to control a flow of the solution across the recess area, the second weir structure is disposed within the inner volume of the body above and on a second side of the recess area.

41. The electrophoresis cell of claim 40, wherein the first weir structure and the second weir structure are each removably coupled to the body.

42. The electrophoresis cell of claim 22, wherein the chip includes an identification member, the assay device including a sensor configured to identify the identification member when the electrophoresis cell is inserted into the receptacle.

43. The electrophoresis cell of claim 42, wherein the identification member includes at least one of a one-dimensional identification barcode, a two-dimensional identification barcode, and a radio frequency identification (RFID) unit.

44. The electrophoresis cell of claim 42, wherein the assay device determines a set of assay parameters for the assaying the biological sample in response to the sensor identifying the identification member.

45. The electrophoresis cell of claim 22, wherein the weir structure is disposed between the at least one side of the recess area and the electrode coupled to the body to prevent bubbles generated by the electrode disposed on a first side of the weir structure from flowing across the chip disposed on a second side of the weir structure opposite the first side when the electrophoresis cell is within the receptacle.

46. The electrophoresis cell of claim 22, wherein the weir structure is disposed between the at least one side of the recess area and the electrode coupled to the body to prevent bubbles resulting from a volume of the solution being poured into the inner volume on a first side of the weir structure from flowing across the chip disposed on a second side of the weir structure opposite the first side when the electrophoresis cell is within the receptacle.

\* \* \* \* \*

UNITED STATES PATENT AND TRADEMARK OFFICE
CERTIFICATE OF CORRECTION

PATENT NO. : 11,237,131 B2
APPLICATION NO. : 15/160636
DATED : February 1, 2022
INVENTOR(S) : Molho et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 525 days.

Signed and Sealed this
Twenty-ninth Day of November, 2022

Katherine Kelly Vidal
*Director of the United States Patent and Trademark Office*